US012049605B2

(12) United States Patent
Sunder et al.

(10) Patent No.: US 12,049,605 B2
(45) Date of Patent: Jul. 30, 2024

(54) MULTI-PHASE CLEANING AGENT POUCH

(71) Applicant: Henkel AG & Co. KGaA, Duesseldorf (DE)

(72) Inventors: Matthias Sunder, Duesseldorf (DE); Luca Bellomi, Duesseldorf (DE); Oliver Kurth, Langenfeld (DE); Robert Stephen Cappleman, Duisburg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 292 days.

(21) Appl. No.: 16/513,655

(22) Filed: Jul. 16, 2019

(65) Prior Publication Data

US 2020/0024555 A1 Jan. 23, 2020

(30) Foreign Application Priority Data

Jul. 23, 2018 (DE) ......................... 102018212208.3

(51) Int. Cl.

| | |
|---|---|
| ***C11D 17/04*** | (2006.01) |
| ***C11D 3/20*** | (2006.01) |
| ***C11D 3/37*** | (2006.01) |
| ***C11D 11/00*** | (2006.01) |

(52) U.S. Cl.

CPC ........ *C11D 17/043* (2013.01); *C11D 11/0082* (2013.01); *C11D 2111/12* (2024.01); *C11D 2111/14* (2024.01)

(58) Field of Classification Search

None

See application file for complete search history.

(56) References Cited

U.S. PATENT DOCUMENTS

| | | | | | |
|---|---|---|---|---|---|
| 5,160,654 | A * | 11/1992 | Falou | C11D 17/044 | 510/513 |
| 7,179,781 | B2 * | 2/2007 | Fine | C11D 3/06 | 510/276 |
| 2004/0224872 | A1 * | 11/2004 | Fine | C11D 3/2075 | 510/438 |
| 2010/0113318 | A1 * | 5/2010 | Wiedemann | C11D 11/00 | 510/218 |
| 2012/0108487 | A1 * | 5/2012 | Graham | C11D 17/042 | 510/221 |
| 2013/0256182 | A1 * | 10/2013 | Petrovicova | B65D 65/46 | 206/524.7 |
| 2015/0184115 | A1 * | 7/2015 | Meier | C11D 3/162 | 510/406 |
| 2019/0276779 | A1 * | 9/2019 | Sunder | C11D 3/3935 | |
| 2019/0345420 | A1 * | 11/2019 | Kurth | C11D 3/2044 | |
| 2019/0345422 | A1 * | 11/2019 | Sunder | C11D 17/044 | |

FOREIGN PATENT DOCUMENTS

| | | | | |
|---|---|---|---|---|
| DE | 102015213938 | A1 | 1/2017 | |
| DE | 102015213939 | A1 | 1/2017 | |
| DE | 102017201094 | A1 * | 7/2018 | C11D 17/00 |
| EP | 1517983 | A1 | 3/2005 | |
| EP | 3181674 | A1 | 6/2017 | |
| JP | H05214398 | A | 8/1993 | |
| WO | WO 2016024093 | A1 * | 2/2016 | |
| WO | 2017013162 | A1 | 1/2017 | |
| WO | 2018138124 | A1 | 8/2018 | |

* cited by examiner

*Primary Examiner* — Lorna M Douyon

(74) *Attorney, Agent, or Firm* — Bojuan Deng

(57) ABSTRACT

A washing and/or cleaning agent portion which includes at least one chamber and a water-soluble wrapping, characterized in that it includes at least one particulate phase. The at least one particulate phase being brought into direct contact with at least one liquid composition, and to corresponding preparation methods.

14 Claims, No Drawings

MULTI-PHASE CLEANING AGENT POUCH

FIELD OF THE INVENTION

The invention relates to a washing and/or cleaning agent portion which comprises at least one chamber and a water-soluble wrapping, characterized in that it comprises at least one particulate phase, the at least one particulate phase being brought into direct contact with at least one liquid composition, and to corresponding preparation methods.

BACKGROUND OF THE INVENTION

Washing or cleaning agents are usually present in solid form (as tablets, for example) or in liquid form (or also as a flowing gel). Liquid washing or cleaning agents in particular are increasingly popular with consumers.

Solid washing or cleaning agents have the advantage that, unlike liquid washing or cleaning agents, they do not require any preservatives. Liquid product formats are increasingly gaining acceptance in the market, particularly due to their quick solubility and the resulting quick availability of the active ingredients they contain. This gives the consumer the option of using abbreviated rinse cycles while still obtaining good cleaning performance.

Furthermore, consumers have grown accustomed to the convenient metering of pre-portioned machine washing or cleaning agents, such as dishwashing detergents, and use these products in the form of tablets (solid washing or cleaning agents) or in the form of pouches that are filled with what is usually a liquid washing or cleaning agent. Single-use portions in water-soluble pouches are therefore increasingly popular with consumers not only because they no longer come into contact with the chemical composition, but also not least because of the attractive appearance of the pouches. The appearance of the metered form is becoming increasingly important. Besides good cleaning performance and adequate storage stability, a good appearance is one of the reasons on which the selection of a product is based.

Solid cleaning agent formulations having a high surfactant content usually have high adhesiveness and poor pouring or flow behavior. This results in poorer metering during preparation. In particular, only lower bulk weights are achieved in the process, and therefore greater volumes must be used for the same performance of the cleaning agent. Especially in pre-proportioned cleaning agent portions, larger cavities must then be used, but this is usually limited by the size of the metering chamber.

BRIEF SUMMARY OF THE INVENTION

The problem addressed by the present invention is therefore to provide washing or cleaning agent portions which are compact and at the same time have good, in particular even improved, washing or cleaning performance.

A first subject of the present invention relates to a washing and/or cleaning agent portion which comprises at least one chamber and a water-soluble wrapping, characterized in that it comprises at least one particulate phase, the at least one particulate phase being brought into direct contact with at least one liquid composition.

The washing or cleaning agent portions according to the invention are more compact due to the particulate phase coming into direct contact with a liquid composition. The particulate phase is impregnated with the liquid phase, in a manner of speaking. In the process, the liquid phase preferably enters the particulate phase or is absorbed by it in another way, e.g. by the liquid composition diffusing into the pores of the particulate phase.

A second subject of the present invention relates to a preparation method for washing or cleaning agent portions which results in a more compact washing and/or cleaning agent portion having good or even improved cleaning. This preparation method will be explained in more detail below.

The preparation method according to the invention also results in greater compactness of the cleaning agent in the portioned pouches, which are filled with free-flowing formulations by bringing compositions into contact which would otherwise negatively affect the free-flowing ability.

Advantageously, product changes, for example to other surfactants or quantities of surfactants or perfumes, can thus be carried out more easily in production.

In particular for surfactants, a higher surfactant content can be achieved in particular with liquid surfactants than is possible with normal, particulate formulations, since these should be as free-flowing as possible for improved processability.

When separately metering perfume oils, another advantage, in addition to the improved processability and a higher product density, is that no intensive cleaning of the system is necessary if you want to switch to a new fragrance or a new perfume.

The washing and/or cleaning agent portion may have one or more chambers. In the at least one chamber, at least one particulate phase is brought into direct contact with at least one liquid phase.

Within the meaning of the present invention, a phase is a spatial region in which physical parameters and the chemical composition are homogeneous. One phase differs from another phase in terms of its different features, such as ingredients, physical properties, external appearance, or spatial separation or arrangement, etc. Preferably, different phases can be differentiated visually from one another. The at least one particulate phase can thus be clearly distinguished by a consumer from other phases. If the washing or cleaning agent according to the invention has more than one particulate phase, then they can also each be distinguished from one another with the naked eye because of their different coloration, for example. The same applies if two or more phases are present. In this case as well, a visual differentiation of the phases, for example on the basis of a difference in coloration or transparency, is possible. Within the meaning of the present invention, phases are thus self-contained regions that can be differentiated visually from one another by a consumer with the naked eye. The individual phases can have different properties when used, such as the speed at which the phase dissolves in water and hence the speed and the sequence of the release of the ingredients contained in the relevant phase.

In the context of the present invention, the particulate phase is understood to mean a granular mixture of a solid composition. In this case, the particulate phase is formed from a large number of loose, solid particles, which in turn comprise what are known as grains. According to the invention, the term "particulate phase" covers particles, grains, powders and/or granules.

A grain is a name for the particulate constituents of powders (grains are the loose, solid particles), dusts (grains are the loose solid particles), granules (loose, solid particles are agglomerates of several grains) and other granular mixtures.

A preferred embodiment of the granular mixture of the composition of the particulate phase is the powder and/or the granular material; when reference is made to "powder" or "granules," this also includes these being mixtures of different powders or different granules. Accordingly, powder and granular material are intended to mean mixtures of different powders with different granules. Said solid particles of the granular mixture in turn preferably have a particle diameter $X_{50.3}$ (volume average) of from 10 to 1,500 μm, more preferably from 200 μm to 1,200 μm, particularly preferably from 600 μm to 1,100 μm. Said particle sizes can be determined by sieving or by means of a Camsizer particle size analyzer from the company Retsch.

It is also advantageous that the appearance or composition of particulate phases can be more easily changed than for a compressed tablet. In particular, texture differences, such as coarse and fine particles and particles or regions having different colors—either all over or as colored flecks—can be used to improve a visually pleasing appearance. In addition, this offers improved solubility in comparison with compressed tablets, even without the addition of disintegrants.

DETAILED DESCRIPTION OF THE INVENTION

These and other aspects, features, and advantages of the invention will become apparent to a person skilled in the art through the study of the following detailed description and claims. Any feature from one aspect of the invention can be used in any other aspect of the invention. Furthermore, it will readily be understood that the examples contained herein are intended to describe and illustrate but not to limit the invention and that, in particular, the invention is not limited to these examples. Unless indicated otherwise, all percentages are indicated in terms of wt. %. Numerical ranges that are indicated in the format "from x to y" also include the stated values. If several preferred numerical ranges are indicated in this format, it is self-evident that all ranges that result from the combination of the various endpoints are also included.

"At least one," as used herein, means one or more, i.e. one, two, three, four, five, six, seven, eight, nine, or more. In relation to an ingredient, the expression refers to the type of ingredient and not to the absolute number of molecules. "At least one bleach catalyst" therefore means at least one type of bleach catalyst, for example—that is, that one type of bleach catalyst or a mixture of several different bleach catalysts can be used. Together with weight specifications, the expression relates to all compounds of the type indicated that are contained in the composition/mixture, that is to say that the composition does not contain any other compounds of this type beyond the indicated quantity of the corresponding compounds.

When reference is made herein to molar masses, this information always refers to the number-average molar mass $M_n$, unless explicitly indicated otherwise. The number-average molar mass can, for example, be determined by gel permeation chromatography (GPC) according to DIN 55672-1:2007-08 with THF as the eluent. The number-average molar mass $M_w$ can also be determined by means of GPC, as described for $M_n$.

Unless explicitly indicated otherwise, all percentages that are cited in connection with the compositions described herein relate to wt. %, in each case with respect to the relevant mixture or phase.

According to a preferred embodiment, the washing and/or cleaning agent portion is characterized in that the at least one particulate phase, preferably at the time of addition, is free-flowing. This is important for the preparation of the washing or cleaning agent portions so that it is possible to uniformly fill portion packages of this type, both in terms of an identical quantity and an identical composition.

The granular mixture of the solid composition of the present invention serving as the particulate phase is preferably present in free-flowing form (particularly preferably as a free-flowing powder and/or free-flowing granules). The agent of the portion according to the invention thus comprises at least one particulate phase (a phase of a free-flowing, granular mixture of a solid composition).

The flowability of a granular mixture, especially of the particulate phase, relates to its ability to flow freely under its own weight. The free-flowing ability is determined by the flow time of 1,000 ml of washing or cleaning agent powder out of a standardized flow-test funnel, which is initially closed in its discharge direction and has an outlet of 16.5 mm in diameter, being measured by measuring the time for the complete outflow of the granular mixture, in particular the particulate phase, after opening the outlet, and being compared with the outflow speed (in seconds) of a standard test sand of which the outflow speed is defined as 100%. The defined sand mixture for calibrating the flow apparatus is dry sea sand. In this case, sea sand having a particle diameter of from 0.4 to 0.8 mm is used, as is available for example from Carl Roth, Germany, CAS no. [14808-60-7]. For drying, the sea sand is dried before the measurement for 24 hours at 60° C. in a drying cabinet on a plate at a maximum layer height of 2 cm.

Preferred embodiments of the particulate phases according to the invention have an angle of repose/angle of slope of from 26 to 35, of from 27 to 34, of from 28 to 33, wherein the angle of repose is determined according to the method mentioned below 24 hours after the preparation of the granular mixture of the solid composition/the particulate phase, and storage at 20° C. Such angles of repose have the advantage that the cavities can be filled with the at least one particulate phase comparatively quickly and precisely.

To determine the angle of repose (also referred to as the angle of slope) of the at least one particulate phase, a powder funnel having a capacity of 400 ml and an outlet having a diameter of 25 mm is simply suspended in a tripod. The funnel is moved upwards by means of a manually operated knurling wheel at a speed of 80 mm/min such that the granular mixture, in particular the particulate phase, preferably the powder and/or granular material, e.g. the powder, flows out. As a result, what is known as a conical heap is formed. The conical heap height and the conical heap diameter are determined for the individual particulate phases. The angle of slope is calculated from the quotient of the conical heap height and the conical heap diameter*100.

Granular mixtures of a solid composition, in particular particulate phases, preferably the powders and/or granular material, e.g. the powders, having a free-flowing ability in %, compared with the above-mentioned standard test substance, of greater than 40%, preferably greater than 50, in particular greater than 55%, more preferably greater than 60%, particularly preferably between 63% and 80%, for example between 65% and 75%, are particularly suitable. Granular mixtures of a solid composition, in particular powders and/or granular material having a free-flowing ability in %, compared with the above-mentioned standard test substance, of greater than 40%, preferably greater than 45%, in particular greater than 50%, more preferably greater than 55%, particularly preferably greater than 60%, are particularly suitable, the free-flowing ability being measured 24 hours after the preparation of the powder and storage at 20° C.

Lower values for the free-flowing ability are rather unsuitable, since from a process point of view, precise metering of the granular mixture, in particular the particulate phase, preferably the powder and/or granular material, e.g. the powder, is necessary. In particular, the values greater than 50%, in particular greater than 55%, preferably greater than 60% (where the measurement of the free-flowing ability is carried out 24 hours after the preparation of the powder and storage at 20° C.) have proved to be advantageous, since the good metering ability of the granular mixture, in particular the particulate phases, preferably the powder and/or granular material, e.g. powder, leads to only minor fluctuations in the metered quantity or the composition. The more accurate metering leads to consistent product performance, and economic losses due to over-metering are thus avoided. It is further advantageous for the granular mixture, in particular the particulate phase, preferably the powder and/or granular material, e.g. the powder, to be well metered so that a faster sequence of the metering process can be achieved. In addition, such a good free-flowing ability makes it easier to avoid the situation whereby the granular mixture, in particular the particulate phase, preferably the powder and/or granular material, e.g. the powder, reaches the part of the water-soluble wrapping which is provided for producing the sealing seam and therefore ought to remain as free as possible of grains, in particular powder-free.

According to a preferred embodiment, the at least one liquid composition comprises perfume preparations and/or surfactants, preferably non-ionic surfactants. In this case, the at least one liquid composition is preferably low in water, in particular substantially water-free. This has the advantage that the particulate phase, which usually contains washing or cleaning-active substances which can sometimes react with one another in water and/or in aqueous solutions, does not undergo these reactions during preparation and/or during storage of the portion. This improves product preparation as well as shelf life and thus product stability in general.

Surprisingly, it has been found that an especially high level of storage stability is achieved if the at least one liquid composition is low in water.

Low in water within the meaning of the present invention means that small amounts of water can be used to prepare a phase or composition. The proportion of water in this phase or composition is in particular 20 wt. % or less, preferably 15 wt. % or less, particularly 12 wt. % or less, in particular between 10 and 5 wt. %. The specifications in wt. % refer to the total weight of the relevant phase or composition.

According to another embodiment, the at least one liquid composition is substantially water-free. Water-free within the meaning of the invention means that the relevant phase or composition is preferably substantially free of water. "Substantially free" means in this case that the phase or composition may contain small amounts of water. For example, this water can be introduced into the phase by means of a solvent or as water of crystallization or as a result of reactions of components of the phase with each other. However, small amounts of water, and in particular no water, are used as a solvent for preparing the corresponding phase or composition. The proportion of water in the phase or composition in this embodiment is 4.9 wt. % or less, 4 wt. % or less, preferably 2 wt. % or less, in particular 1 wt. % or less, particularly 0.5 wt. % or less, in particular 0.1 wt. % or 0.05 wt. % or less. The specifications in wt. % refer to the total weight of the relevant phase or composition.

According to a preferred embodiment, the weight ratio of the total quantity of the at least one liquid composition to the total quantity of the at least one particulate phase is from 1:800 to 5:1, in particular from 1:600 to 2:1, preferably from 1:500 to 2:1, for example from 1:450 to 1:1.

The proportion by weight of the at least one liquid composition in the total weight of the composition formed from the at least one liquid composition and the at least one particulate composition is preferably 0.0001 to 25 wt. %, in particular 0.005 to 20 wt. %, preferably 0.1 to 18 wt. %, most preferably 0.2 to 15 wt. %.

It is particularly preferred that, when the at least one liquid composition comprises at least one surfactant, preferably a non-ionic surfactant, the total quantity of the at least one liquid composition to the total quantity of the at least one particulate phase is from 1:200 to 5:1, in particular from 1:100 to 1:1, preferably from 1:50 to 1:2, for example from 1:20 to:1 and/or the weight proportion of the at least one liquid composition to the total weight of the composition formed from the at least one liquid composition and the at least one particulate composition is from 0.01 to 25 wt. %, in particular 0.1 to 20 wt. %, preferably 1 to 18 wt. %, most preferably 3 to 15 wt. %.

The washing or cleaning agent according to the invention preferably comprises at least one surfactant. This surfactant is selected from the group of the anionic, non-ionic, and cationic surfactants. The washing or cleaning agent according to the invention can also contain mixtures of several surfactants that are selected from the same group.

According to the invention, both the at least one particulate phase and the at least one liquid composition comprise at least one surfactant in each case. It is also possible, however, for only the at least one particulate phase or only the at least one liquid composition to comprise at least one surfactant. However, it is also possible for the phases or formulations to have a different surfactant/surfactants or the same surfactant/surfactants.

Particulate phases and liquid compositions according to the invention thus preferably comprise at least one surfactant, preferably at least one non-ionic surfactant. All non-ionic surfactants that are known to a person skilled in the art can be used as non-ionic surfactants. Preferably, low-foaming non-ionic surfactants are used, in particular alkoxylated, especially ethoxylated, low-foaming non-ionic surfactants. These will be specified in greater detail below.

Suitable non-ionic surfactants include alkyl glycosides of general formula $RO(G)_x$, for example, in which R corresponds to a primary straight-chain or methyl-branched aliphatic functional group, in particular an aliphatic functional group that is methyl-branched in the 2 position, having 8 to 22, preferably 12 to 18, C atoms, and G is the symbol that represents a glycose unit having 5 or 6 C atoms, preferably glucose. The degree of oligomerization x, which indicates the distribution of monoglycosides and oligoglycosides, is any number between 1 and 10; x is preferably between 1.2 and 1.4.

Another class of preferred non-ionic surfactants, which are used either as the sole non-ionic surfactant or in combination with other non-ionic surfactants, are alkoxylated, preferably ethoxylated or ethoxylated and propoxylated fatty acid alkyl esters, preferably having 1 to 4 carbon atoms in the alkyl chain.

Non-ionic surfactants of the amine oxide type, for example N-cocoalkyl-N,N-dimethylamine oxide and N-tallowalkyl-N,N-dihydroxyethylamine oxide, and of the fatty acid alkanolamide type may also be suitable. The quantity of these non-ionic surfactants is preferably no more than that of the ethoxylated fatty alcohols, in particular no more than half thereof.

Additional suitable surfactants are the polyhydroxy fatty acid amides, known as PHFAs. Particularly preferably, the washing or cleaning agents according to the invention, in particular cleaning agents for dishwashers, contain non-ionic surfactants from the group of alkoxylated alcohols. Non-ionic surfactants that are preferably used are alkoxylated, advantageously ethoxylated, in particular primary alcohols having preferably 8 to 18 C atoms and, on average, 1 to 12 mol ethylene oxide (EO) per mol of alcohol, in which the alcohol functional group can be linear or preferably methyl-branched in the 2 position, or can contain linear and methyl-branched functional groups in admixture, as are usually present in oxo alcohol functional groups. However, alcohol ethoxylates having linear functional groups of alcohols of native origin having 12 to 18 C atoms, for example from coconut, palm, tallow fatty or oleyl alcohol, and an average of 2 to 8 EO per mol of alcohol, are particularly preferred. Examples of preferred ethoxylated alcohols include $C_{12-14}$ alcohols having 3 EO or 4 EO, $C_{8-11}$ alcohol having 7 EO, $C_{13-15}$ alcohols having 3 EO, 5 EO, 7 EO or 8 EO, $C_{12-18}$ alcohols having 3 EO, 5 EO or 7 EO, and mixtures thereof, such as mixtures of $C_{12-14}$ alcohol having 3 EO and $C_{12-18}$ alcohol having 5 EO.

Preferred alcohol ethoxylates have a narrowed homolog distribution (narrow range ethoxylates, NRE). In addition to these non-ionic surfactants, fatty alcohols having more than 12 EO can also be used. Examples of these are tallow fatty alcohols having 14 EO, 25 EO, 30 EO, or 40 EO.

Ethoxylated non-ionic surfactants are particularly preferably used which were obtained from $C_{6-20}$ monohydroxy alkanols or $C_{6-20}$ alkyl phenols or $C_{16-20}$ fatty alcohols and more than 12 mol, preferably more than 15 mol, and in particular more than 20 mol, ethylene oxide per mol of alcohol. A particularly preferred non-ionic surfactant is obtained from a straight-chain fatty alcohol having 16 to 20 carbon atoms ($C_{16-20}$ alcohol), preferably from a $C_{18}$ alcohol and at least 12 mol, preferably at least 15 mol and in particular at least 20 mol, ethylene oxide. Among these, what are referred to as narrow range ethoxylates are particularly preferred.

Surfactants that are preferably used come from the groups of the alkoxylated non-ionic surfactants, in particular the ethoxylated primary alcohols and mixtures of these surfactants with structurally complex surfactants such as polyoxypropylene/polyoxyethylene/polyoxypropylene ((PO/EO/PO) surfactants). Such (PO/EO/PO) non-ionic surfactants are also characterized by good foam control.

In the context of the present invention, low-foaming non-ionic surfactants which have alternating ethylene oxide and alkylene oxide units have proven to be particularly preferred. Among these, in turn, surfactants having EO-AO-EO-AO blocks are preferred, with one to ten EO groups and AO groups being bonded to each other in each case, before a block follows from the other group. Here, non-ionic surfactants of general formula $$R^1—O—(CH_2—CH_2—O)_w—(CH_2—\underset{R^2}{CH}—O)_x—(CH_2—CH_2—O)_y—(CH_2—\underset{R^3}{CH}—O)_z—H$$

are preferred, in which $R^1$ represents a straight-chain or branched, saturated or mono- or polyunsaturated $C_{6-24}$ alkyl or alkenyl functional group; each $R^2$ and $R^3$ group is selected, independently of one another, from —$CH_3$, —$CH_2CH_3$, —$CH_2CH_2$—$CH_3$, —$CH(CH_3)_2$, and the indices w, x, y, z, independently of one another, represent integers from 1 to 6.

Preferred non-ionic surfactants of the above formula can be produced, using known methods, from the corresponding alcohols $R^1$—OH and ethylene or alkylene oxide. The $R^1$ functional group in the above formula can vary depending on the origin of the alcohol. If native sources are used, the functional group $R^1$ has an even number of carbon atoms and is generally unbranched, the linear functional groups consisting of alcohols of native origin with 12 to 18 C atoms, for example coconut, palm, tallow fat or oleyl alcohol, being preferred. Some examples of alcohols that are available from synthetic sources are the Guerbet alcohols or functional groups that are methyl-branched or linear and methyl-branched in the 2 position in admixture, such as those usually present in oxo alcohol functional groups. Irrespective of the type of alcohol used to prepare the non-ionic surfactants contained in the agents, non-ionic surfactants are preferred in which $R^1$ represents an alkyl functional group having 6 to 24, preferably 8 to 20, particularly preferably 9 to 15, and in particular 9 to 11, carbon atoms in the above formula.

Besides propylene oxide, butylene oxide in particular is worthy of consideration as an alkylene oxide unit that is contained alternately with the ethylene oxide unit in the preferred non-ionic surfactants. However, other alkylene oxides in which $R^2$ and $R^3$ are selected, independently of one another, from —$CH_2CH_2$—$CH_3$ and —$CH(CH_3)_2$ are also suitable. Preferably, non-ionic surfactants of the above formula are used in which $R^2$ and $R^3$ represent a —$CH_3$ functional group; w and x represent, independently of one another, values of 3 or 4; and y and z represent, independently of one another, values of 1 or 2.

Other non-ionic surfactants that are preferably used are non-ionic surfactants of general formula $R^1O(AlkO)xM(OAlk)_yOR^2$, where $R^1$ and $R^2$, independently of one another, represent a branched or unbranched, saturated or unsaturated, optionally hydroxylated alkyl functional group having 4 to 22 carbon atoms; Alk represents a branched or unbranched alkyl functional group having 2 to 4 carbon atoms; x and y, independently of one another, represent values between 1 and 70; and M represents an alkyl functional group from the group $CH_2$, $CHR^3$, $CR^3R^4$, $CH_2CHR^3$ and $CHR^3CHR^4$, where $R^3$ and $R^4$, independently of one another, represent a branched or unbranched, saturated or unsaturated alkyl functional group having 1 to 18 carbon atoms.

In this case, non-ionic surfactants of general formula $R^1$—$CH(OH)CH_2$—$O(CH_2CH_2O)_xCH_2CHR(OCH_2CH_2)_y$—$CH_2CH(OH)$—$R^2$ are preferred, where R, $R^1$ and $R^2$ represent, independently of one another, an alkyl group or alkenyl functional group having 6 to 22 carbon atoms, and x and y represent, independently of one another, values between 1 and 40.

In particular, compounds of general formula $R^1$—CH(OH)$CH_2$—$O(CH_2CH_2O)_xCH_2CHR(OCH_2CH_2)_yO$—$CH_2CH(OH)$—$R^2$ are preferred, in which R represents a linear, saturated alkyl functional group having 8 to 16 carbon atoms, preferably 10 to 14 carbon atoms, and n and m represent, independently of one another, values of from 20 to 30. Such compounds can be obtained, for example, by reacting alkyl diols HO—CHR—$CH_2$—OH with ethylene oxide, with a reaction with an alkyl epoxide taking place subsequently in order to close the free OH functions while forming a dihydroxy ether.

In this case, preferred non-ionic surfactants are those of general formula $R^1$—$CH(OH)CH_2O$-$(AO)_w$-$(AO)_x$-$(A''O)_y$-$(A'''O)_z$—$R^2$, in which

- $R^1$ represents a straight-chain or branched, saturated or mono- or polyunsaturated $C_{6-24}$ alkyl functional group or alkenyl functional group;
- $R^2$ represents hydrogen or a linear or branched hydrocarbon functional group having 2 to 26 carbon atoms;
- A, A', A'' and A''' represent, independently of one another, a functional group from the group —$CH_2CH_2$, —$CH_2CH_2$—$CH_2$, —$CH_2$—$CH(CH_3)$, —$CH_2$—$CH_2$—$CH_2$—$CH_2$, —$CH_2$—$CH(CH_3)$—$CH_2$—, —$CH_2$—$CH(CH_2$—$CH_3)$;
- w, x, y and z represent values of between 0.5 and 120, where x, y and/or z can also be 0.

By adding the above-mentioned non-ionic surfactants of general formula $R^1$—$CH(OH)CH_2O$-$(AO)_w$-$(A'O)_x$-$(A''O)_y$-$(A'''O)_z$—$R^2$, subsequently also referred to as 'hydroxy mixed ethers', surprisingly, the cleaning performance of preparations according to the invention can be significantly improved, both in comparison with surfactant-free systems and in comparison with systems containing alternative non-ionic surfactants, for example from the group of polyalkoxylated fatty alcohols.

By using these non-ionic surfactants having one or more free hydroxyl groups on one or both terminal alkyl functional groups, the stability of the enzymes contained in the cleaning agent preparations according to the invention can be improved substantially.

In particular, those end-capped poly(oxyalkylated) non-ionic surfactants are preferred which, according to the following formula

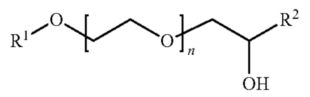

besides a functional group $R^1$, which represents linear or branched, saturated or unsaturated, aliphatic or aromatic hydrocarbon functional groups having 2 to 30 carbon atoms, preferably having 4 to 22 carbon atoms, also have a linear or branched, saturated or unsaturated, aliphatic or aromatic hydrocarbon functional group $R^2$ having 1 to 30 carbon atoms, where n represents values of between 1 and 90, preferably values of between 10 and 80, and in particular values of between 20 and 60. Surfactants of the above formula are particularly preferred in which $R^1$ represents $C_7$ to $C_{13}$, n represents a whole natural number from 16 to 28, and $R^2$ represents $C_8$ to $C_{12}$.

Surfactants of the formula $R^1O[CH_2CH(CH_3)O]_x[CH_2CH_2O]_yCH_2CH(OH)R^2$ are particularly preferred, in which $R^1$ represents a linear or branched aliphatic hydrocarbon functional group having 4 to 18 carbon atoms or mixtures thereof, $R^2$ denotes a linear or branched hydrocarbon functional group having 2 to 26 carbon atoms or mixtures thereof, x represents values between 0.5 and 1.5, and y represents a value of at least 15. The group of these non-ionic surfactants includes, for example, the $C_{2-26}$ fatty alcohol $(PO)_1$-$(EO)_{15-40}$-2-hydroxyalkyl ethers, in particular including the $C_{8-10}$ fatty alcohol $(PO)_1$-$(EO)_{22}$-2-hydroxydecyl ethers.

Furthermore, those end-capped poly(oxyalkylated) non-ionic surfactants of formula $R^1O[CH_2CH_2O]_x[CH_2CH(R^3)O]_yCH_2CH(OH)R^2$ are particularly preferred in which $R^1$ and $R^2$, independently of one another, represent a linear or branched, saturated or mono- or polyunsaturated hydrocarbon functional group having 2 to 26 carbon atoms, $R^3$, independently of one another, is selected from —$CH_3$, —$CH_2CH_3$, —$CH_2CH_2$—$CH_3$, —$CH(CH_3)_2$, but preferably represents —$CH_3$, and x and y, independently of one another, represent values between 1 and 32, with non-ionic surfactants in which $R^3$=—$CH_3$ and having values for x of from 15 to 32 and for y of from 0.5 and 1.5 being very particularly preferred.

Further non-ionic surfactants which can preferably be used are the end-capped poly(oxyalkylated) non-ionic surfactants of formula $R^1O[CH_2CH(R^3)O]_x[CH_2]_kCH(OH)[CH_2]_jR^2$, in which $R^1$ and $R^2$ represent linear or branched, saturated or unsaturated, aliphatic or aromatic hydrocarbon functional groups having 1 to 30 carbon atoms, $R^3$ represents H or a methyl, ethyl, n-propyl, iso-propyl, n-butyl, 2-butyl or 2-methyl-2-butyl functional group, x represents values between 1 and 30, and k and j represent values between 1 and 12, preferably between 1 and 5. If the value x is >2, each $R^3$ in the above formula $R^1O[CH_2CH(R^3)O]_x[CH_2]_kCH(OH)[CH_2]_jOR^2$ can be different. $R^1$ and $R^2$ are preferably linear or branched, saturated or unsaturated, aliphatic or aromatic hydrocarbon functional groups having 6 to 22 carbon atoms, with functional groups having 8 to 18 C atoms being particularly preferred. For the functional group $R^3$, H, —$CH_3$ or —$CH_2CH_3$ are particularly preferred. Particularly preferred values for x are in the range of from 1 to 20, in particular from 6 to 15.

As described above, each $R^3$ in the above formula can be different if x is >2. In this way, the alkylene oxide unit in square brackets can be varied. For example, if x represents 3, the functional group $R^3$ can be selected in order to form ethylene oxide ($R^3$=H) or propylene oxide ($R^3$=$CH_3$) units, which can be joined together in any sequence, for example (EO)(PO)(EO), (EO)(EO)(PO), (EO)(EO)(EO), (PO)(EO)(PO), (PO)(PO)(EO) and (PO)(PO)(PO). The value 3 for x has been selected here by way of example and can by all means be greater, in which case the range of variation increases as the values for x increase and includes a large number of (EO) groups combined with a small number of (PO) groups, for example, or vice versa.

Particularly preferred end-capped poly(oxyalkylated) alcohols of the above formula have values of k=1 and j=1, such that the previous formula is simplified to $R^1O[CH_2CH(R^3)O]_xCH_2CH(OH)CH_2OR^2$. In the above-mentioned formula, $R^1$, $R^2$ and $R^3$ are as defined above and x represents numbers from 1 to 30, preferably 1 to 20, and in particular 6 to 18. Surfactants in which the functional groups $R^1$ and $R^2$ have 9 to 14 C atoms, $R^3$ represents H, and x assumes values from 6 to 15 are particularly preferred. Finally, the non-ionic surfactants of general formula $R^1$—$CH(OH)CH_2O$-$(AO)_w$—$R^2$ have proven to be particularly effective, in which $R^1$ represents a straight-chain or branched, saturated or mono- or polyunsaturated $C_{6-24}$ alkyl or alkenyl functional group;

$R^2$ represents a linear or branched hydrocarbon functional group having 2 to 26 carbon atoms;

A represents a functional group from the group $CH_2CH_2$, $CH_2CH_2CH_2$, $CH_2CH(CH_3)$, preferably $CH_2CH_2$, and w represents values between 1 and 120, preferably 10 to 80, particularly 20 to 40.

The group of these non-ionic surfactants includes, for example, the $C_{4-22}$ fatty alcohol-$(EO)_{10-80}$-2-hydroxyalkyl ethers, in particular including the $C_{8-12}$ fatty alcohol-$(EO)_{22}$-2-hydroxydecyl ethers and the $C_{4-22}$ fatty alcohol-$(EO)_{40-80}$-2-hydroxyalkyl ethers.

Preferably, the at least one particulate and/or the at least one gel phase and/or liquid preparation contains at least one non-ionic surfactant, preferably a non-ionic surfactant from the group of the hydroxy mixed ethers, with the proportion by weight of the non-ionic surfactant with respect to the total weight of the second phase being preferably 0.5 wt. % to 30 wt. %, more preferably 5 wt. % to 25 wt. %, and in particular 10 wt. % to 20 wt. %.

In another preferred embodiment, the non-ionic surfactant of the particulate and/or gel phase and/or liquid preparation is selected from non-ionic surfactants of general formula $R^1$—$O(CH_2CH_2O)_xCR^3R^4(OCH_2CH_2)_yO$—$R^2$, in which $R^1$ and $R^2$, independently of one another, represent an alkyl functional group or alkenyl functional group having 4 to 22 carbon atoms; $R^3$ and $R^4$, independently of one another, represent H or an alkyl or alkenyl group having 1 to 18 carbon atoms, and x and y independently represent values between 1 and 40.

In particular, compounds of general formula $R^1$—$O(CH_2CH_2O)_xCR^3R^4(OCH_2CH2)_yO$—$R^2$ are preferred, in which $R^3$ and $R^4$ represent H and the indices x and y, independently of one another, assume values from 1 to 40, preferably from 1 to 15.

In particular, compounds of general formula $R^1$—$O(CH_2CH_2O)_xCR^3R^4(OCH_2CH_2)_yO$—$R^2$ are particularly preferred, in which the functional groups $R^1$ and $R^2$, independently of one another, represent saturated alkyl functional groups having 4 to 14 carbon atoms and the indices x and y, independently of one another, assume values from 1 to 15 and in particular from 1 to 12.

In addition, such compounds of general formula $R^1—O(CH_2CH_2O)_xCR^3R^4(OCH_2CH_2)_yO—R^2$ are preferred in which one of the functional groups $R^1$ and $R^2$ is branched. Compounds of general formula $R^1—O(CH_2CH_2O)_xCR^3R^4(OCH_2CH_2)_yO—R^2$ are very particularly preferred in which the indices x and y, independently of one another, assume values from 8 to 12.

The indicated C chain lengths and degrees of ethoxylation or degrees of alkoxylation of the non-ionic surfactants represent statistical averages that can be an integer or a fraction for a given product. Owing to the manufacturing methods, commercial products of the above-mentioned formulas generally do not consist of an individual representative, but of mixtures, for which reason average values and, resulting from those, fractional numbers can arise both for the C chain lengths and for the degrees of ethoxylation and degrees of alkoxylation.

Naturally, the aforementioned non-ionic surfactants can be used not only as individual substances but also as surfactant mixtures of two, three, four, or more surfactants.

In the at least one particulate phase or liquid composition, those non-ionic surfactants are particularly preferred which have a melting point above room temperature. Non-ionic surfactant(s) having a melting point above 20° C., preferably above 25° C., particularly preferably between 25 and 60° C., and particularly between 26.6 and 43.3° C., is/are particularly preferred.

Suitable non-ionic surfactants having melting or softening points in the above-mentioned temperature range include low-foaming non-ionic surfactants, for example, which can be solid or highly viscous at room temperature. If non-ionic surfactants are used which are highly viscous at room temperature, then it is preferred that they have a viscosity above 20 Pa·s, preferably above 35 Pa·s, and particularly above 40 Pa·s. Non-ionic surfactants that have a wax-like consistency at room temperature are also preferred.

The non-ionic surfactant that is solid at room temperature preferably has propylene oxide (PO) units in the molecule. Preferably, such PO units constitute up to 25 wt. %, particularly preferably up to 20 wt. %, and in particular up to 15 wt. % of the total molar mass of the non-ionic surfactant. Particularly preferred non-ionic surfactants are ethoxylated monohydroxy alkanols or alkyl phenols that additionally have polyoxyethylene-polyoxypropylene block copolymer units. The alcohol or alkyl phenol fraction of such non-ionic surfactant molecules preferably constitutes greater than 30 wt. %, particularly preferably greater than 50 wt. %, and in particular greater than 70 wt. % of the total molar mass of such non-ionic surfactants. Preferred agents are characterized in that they contain ethoxylated and propoxylated non-ionic surfactants in which the propylene oxide units in the molecule constitute up to 25 wt. %, preferably up to 20 wt. %, and particularly up to 15 wt. % of the total molar mass of the non-ionic surfactant.

Additional particularly preferred non-ionic surfactants to be used in the particulate phase or liquid composition having melting points above room temperature contain 40 to 70% of a polyoxypropylene/polyoxyethylene/polyoxypropylene block polymer blend that contains 75 wt. % of a reverse block copolymer of polyoxyethylene and polyoxypropylene with 17 mol of ethylene oxide and 44 mol of propylene oxide and 25 wt. % of a block copolymer of polyoxyethylene and polyoxypropylene, initiated with trimethylolpropane and containing 24 mol of ethylene oxide and 99 mol of propylene oxide per mol of trimethylolpropane.

In one preferred embodiment, the proportion by weight of the non-ionic surfactant with respect to the total weight of the particulate phase is 0.1 to 20 wt. %, particularly preferably 0.5 to 15 wt. %, and in particular 2.5 to 10 wt. %.

All anionic surface-active substances are suitable for use as anionic surfactants in dishwashing detergents. These are characterized by a water-solubilizing, anionic group such as a carboxylate, sulfate, sulfonate or phosphate group and a lipophilic alkyl group having approximately 8 to 30 C atoms. In addition, glycol ether or polyglycol ether groups, ester, ether and amide groups, and hydroxyl groups can be contained in the molecule. Suitable anionic surfactants are preferably present in the form of sodium, potassium and ammonium salts as well as mono-, di- and trialkanolammonium salts with 2 to 4 carbon atoms in the alkanol group, but zinc, manganese(II), magnesium, calcium or mixtures thereof may also serve as counterions.

Preferred anionic surfactants are alkyl sulfates, alkyl polyglycol ether sulfates, and ether carboxylic acids with 10 to 18 C atoms in the alkyl group and up to 12 glycol ether groups in the molecule.

Instead of the above-mentioned surfactants or in conjunction therewith, cationic and/or amphoteric surfactants such as betaines or quaternary ammonium compounds can also be used. It is preferred, however, that no cationic and/or amphoteric surfactants be used.

It is particularly preferred that the total quantity of the at least one liquid composition, comprising at least one non-ionic surfactant, to the total quantity of the at least one particulate phase is in a weight ratio of from 1:200 to 5:1, in particular from 1:100 to 1:1, preferably from 1:50 to 1:2, for example from 1:20 to:1 and/or the weight proportion of the at least one liquid composition to the total weight of the composition formed from the at least one liquid composition and the at least one particulate composition is from 0.01 to 25 wt. %, in particular 0.1 to 20 wt. %, preferably 1 to 18 wt. %, most preferably 3 to 15 wt. %.

According to a further preferred embodiment of the present invention, the surfactant content of the at least one liquid composition is at least 50 wt. %, in particular at least 70 wt. %, preferably at least 80 wt. %, particularly preferably at least 90 wt. %, based on the total weight of the liquid composition. In this case, these may be both liquid surfactants themselves and mixtures of liquid and/or solid surfactants with solvents, preferably organic solvents, in order to improve the incorporation of the surfactants.

Alternatively, it is particularly preferred that, when the at least one liquid composition comprises no surfactant, but instead a perfume preparation, the total quantity of the liquid composition to the total quantity of the at least one particulate phase is from 1:800 to 1:50, in particular from 1:600 to 1:100, preferably from 1:500 to 1:200, for example from 1:400 to 1:250 and/or the weight proportion of the at least one liquid composition to the total weight of the composition formed from the at least one liquid composition and the at least one particulate composition is from 0.001 to 2 wt. %, in particular 0.005 to 1.0 wt. %, preferably 0.1 to 0.8 wt. %, most preferably 0.15 to 0.5 wt. %.

According to a very particularly preferred embodiment, the washing or cleaning agent according to the invention comprises, in addition to the at least one particulate phase and the at least one liquid composition, at least one additional gel phase.

A gel-like phase, hereinafter also referred to as gel phase, is to be understood according to the invention as meaning a composition/phase which has an internally structuring network. This internally structuring (spatial) network is formed by the dispersion of a solid but distributed substance with long or highly branched particles and/or gelling agents, in at least one liquid (the at least one liquid is liquid at 20° C.). Gel phases of this kind are thermoreversible.

This gel phase can be, for example, flowable or dimensionally stable. According to the invention, however, the gel phase is preferably dimensionally stable at room temperature. During preparation, the gelling agent, preferably xanthan gum, gelatin or polyvinyl alcohol and/or derivatives thereof, is brought into contact with a solvent, preferably an organic solvent, preferably one or more polyhydric alcohol(s). This enables a flowable mixture to be obtained that can be molded into shape as desired. After a certain period of time, a gel phase is obtained which remains in the given form, i.e. is dimensionally stable. This time period, the setting time, is preferably 15 minutes or less, more preferably 10 minutes or less, particularly preferably 5 minutes or less. In this case, the at least one gel phase gives way to pressure, but does not deform, and instead returns to its initial state after the pressure has ceased. The at least one gel phase is preferably elastic, in particular linear-elastic.

The at least one gel phase is preferably a molded body. A molded body is a single body that stabilizes itself in the shape imparted to it. This dimensionally stable body is formed from a molding compound (e.g. a composition) in such a way that this molding compound is deliberately brought into a predetermined shape, for example by pouring a liquid composition into a casting mold and then curing the liquid composition, for example as part of a sol-gel process.

Certain minimum requirements apply to formulations of the at least one gel phase. As already mentioned, the gel phase must solidify within as short a time as possible. Long setting times would result in long production time and thus lead to high costs. According to the invention, solidification time means the period of time during which the at least one gel phase changes from a flowable state to a dimensionally stable state which is non-flowable at room temperature during preparation. Room temperature is to be understood as a temperature of 20° C.

The at least one gel phase is preferably a solid gel phase. It is therefore sliceable. For example, it can be cut with a knife after it sets without being destroyed beyond the cut that is made.

Furthermore, the gel phase must be storage stable under normal storage conditions. The gel phase according to the invention is a component of a cleaning agent. Cleaning agents are usually stored for a certain period of time in a household. They are usually stored near the washing machine or dishwasher. For such storage, the gel phase should be stable. Therefore, the gel phase should be stable, especially after a storage period of 4 to 12 weeks, especially 10 to 12 weeks or longer at a temperature of up to 40° C., particularly at 30° C., in particular at 25° C. or at 20° C., and should not deform or otherwise change in consistency during this time.

If the gel phase and a solid phase, in particular a powder phase, are present in direct contact with each other, the gel phase preferably penetrates a maximum of 1 mm into the interstices of the immediately underlying powder phase during the storage period of 4 weeks at 25° C.

A change in volume or shrinkage during storage would be disadvantageous, since that would diminish consumers' acceptance of the product. A leakage of liquid or components sweating out of the gel phase is also undesirable. Here, too, the visual impression is relevant, for one thing. The stability of the gel phase can be influenced by the leakage of liquid, such as solvents, such that the components are no longer stably contained and the washing or cleaning effect can also be influenced as a result.

The at least one gel phase is preferably low in water. This has the advantage that the small amounts of water in combination with PVOH can have a structure-forming or gel-forming effect. According to a preferred embodiment, the at least one gel phase is substantially water-free.

Cleaning agents, preferably dishwashing detergents, particularly automatic dishwashing detergents, preferably contain at least one water-soluble zinc salt, in in particular zinc sulfate and/or zinc acetate, in particular zinc acetate, in a quantity of from 0.05 to 3 wt. %, in particular of from 0.1 to 2.4 wt. %, particularly preferably of from 0.2 to 1.0 wt. %, based on the total weight of the gel phase.

According to a preferred embodiment, the cleaning agents according to the invention, preferably dishwashing detergents, in particular automatic dishwashing detergents, contain in the gel phase a gelling agent, preferably selected from gelatin, xanthan gum and/or polyvinyl alcohol, in particular gelatin or polyvinyl alcohol, particularly preferably polyvinyl alcohol, in a quantity of from 4 to 40, in particular of from 6 to 30 wt. %, particularly preferably in a quantity of from 7 to 24 wt. %, more particularly preferably 8 to 22 wt. %, in particular for example 14 to 20 wt. %, in each case based on the total weight of the gel phase.

According to the invention, the at least one gel phase particularly preferably comprises PVOH (polyvinyl alcohol) and/or derivatives thereof. Polyvinyl alcohols are thermoplastic materials that are manufactured as white to yellowish powders, usually by hydrolysis of polyvinyl acetate. Polyvinyl alcohol (PVOH) is resistant to almost all water-free organic solvents. Polyvinyl alcohols having a molar mass of from 30,000 to 60,000 g/mol are preferred. Within the meaning of the invention, derivatives of PVOH are preferably copolymers of polyvinyl alcohol with other monomers, in particular copolymers with anionic monomers. Suitable anionic monomers are preferably vinyl acetic acid, alkyl acrylates, maleic acid and derivatives thereof, in particular monoalkyl maleates (in particular monomethyl maleate), dialkyl maleates (in particular dimethyl maleate), maleic anhydride, fumaric acid and derivatives thereof, in particular monoalkyl fumarate (in particular monomethyl fumarate), dialkyl fumarate (in particular dimethyl fumarate), fumaric anhydride, itaconic acid and derivatives thereof, in particular monomethyl itaconate, dialkyl itaconate, dimethyl itaconate, itaconic anhydride, citraconic acid (methylmaleic acid) and derivatives thereof, monoalkyl citraconic acid (in particular methyl citraconate), dialkyl citraconic acid (dimethyl citraconate), citraconic anhydride, mesaconic acid (methyl fumaric acid) and derivatives thereof, monoalkyl mesaconate, dialkyl mesaconate, mesaconic anhydride, glutaconic acid and derivatives thereof, monoalkyl glutaconate, dialkyl glutaconate, glutaconic anhydride, vinylsulfonic acid, alkyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate and combinations thereof, and the alkali metal salts or esters of the above-mentioned monomers.

Particular preferred derivatives of PVOH are those selected from copolymers of polyvinyl alcohol with a monomer, in particular selected from the group of monoalkyl maleates (in particular monomethyl maleate), dialkyl maleates (in particular dimethyl maleate), maleic anhydride, and combinations thereof, and the alkali salts or esters of the above mentioned monomers. The values stated for polyvinyl alcohols themselves apply to the suitable molar masses. In the context of the present invention, it is preferred for the at least one gel phase to comprise a polyvinyl alcohol and/or derivatives thereof, preferably polyvinyl alcohol, of which the degree of hydrolysis is preferably 70 to 100 mol. %, in particular 80 to 90 mol. %, particularly preferably 81 to 89 mol. %, and even more preferably 82 to 88 mol. %.

Particularly preferred polyvinyl alcohols are those present as white-yellowish powders or granular material having degrees of polymerization in the range of from approximately 100 to 2,500 (molar masses of from approximately 4,000 to 100,000 g/mol) and degrees of hydrolysis of from 80 to 99 mol. %, preferably from 85 to 90 mol. %, in particular from 87 to 89 mol. %, for example 88 mol. %, which accordingly also contain a residual content of acetyl groups.

PVOH powders which have the above-mentioned properties and are suitable for use in the at least one gel phase are marketed by Kuraray, for example, under the name Mowiol® or Poval®. Exceval® AQ4104 from Kuraray is also suitable, for example. Particularly suitable are Mowiol C30, the Poval® grades, in particular grades 3-83, 3-88, 6-88, 4-85, and particularly preferably 4-88, very particularly preferably Poval 4-88 S2, and Mowiol® 4-88 from Kuraray.

The water solubility of polyvinyl alcohol can be altered by post-treatment with aldehydes (acetalization) or ketones (ketalization). Polyvinyl alcohols which can be acetalized or ketalized with the aldehyde or keto groups of saccharides or polysaccharides or mixtures thereof have been proved to be particularly preferred and, due to their decidedly good solubility in cold water, particularly advantageous. It is extremely advantageous to use the reaction products of polyvinyl alcohol and starch. Furthermore, the water solubility can be altered and thus set at desired values in a targeted manner by complexing with Ni or Cu salts or by treatment with dichromates, boric acid, or borax.

Surprisingly, PVOH has been demonstrated to be particularly suitable for preparing gel phases that meet the requirements set out above. Particular preference is therefore given to at least one gel phase which, in addition to at least one water-soluble zinc salt, in particular zinc sulfate and/or zinc acetate, in particular zinc acetate, comprises PVOH and at least one polyhydric alcohol. Particularly preferably, the at least one gel phase comprises PVOH and at least one polyhydric alcohol.

According to the invention, the at least one gel phase comprises at least one water-soluble zinc salt, in particular zinc sulfate and/or zinc acetate, in particular zinc acetate, PVOH and/or derivatives thereof in a proportion of from about 4 wt. % to 40 wt. %, in particular from 6 wt. % to 30 wt. %, preferably from 7 to 24 wt. %, in particular preferably between 8 wt. % and 22 wt. %. Significantly lower proportions of PVOH do not lead to the formation of a stable gel phase. The values are based in each case on the total weight of the gel phase.

According to a particularly preferred embodiment, the at least one gel phase comprises PVOH (polyvinyl alcohol). These gel phases prepared in this way are particularly high-melting, dimensionally stable (even at 40° C.) and do not change in shape during storage, or change only insignificantly. In particular, they are also less reactive with respect to a direct negative interaction with components of the granular mixture, in particular the powder phase. PVOH can in particular also produce low-water or water-free gel phases without difficulty. Using PVOH as the polymer for the at least one gel phase results in low-viscosity melts at 110-120° C. which can therefore be processed particularly easily, in particular the filling of the gel phase into the water-soluble wrapping can be carried out quickly and accurately without any adhesion or the quantity being inaccurately metered. Furthermore, said gel phases adhere particularly well to the water-soluble wrapping, in particular if it is also made of PVOH. This is also visually advantageous. Due to the rapid solidification of the at least one gel phase comprising PVOH, the further processing of the gel phases can take place particularly quickly. Furthermore, the good solubility of the produced gel phases is particularly favorable for the overall solubility of the cleaning agent. In addition, gel phases having such short solidification times are advantageous in that the at least one solid phase, which is metered thereon and comprises granular mixtures, in particular powder, does not sink into the gel which is not yet completely set or is still too soft. This leads to cleaning agent portions that are less visually attractive.

In the multiphase single-use portions according to the invention that comprise at least one solid phase, it is particularly important that the at least one second phase is dimensionally stable, so that as few interactions as possible can take place between the solid phase and the gel phase. If the at least one gel phase comprises gelatin in addition to PVOH, the tenacity of the gel phase during preparation is increased.

Another preferred subject of the present invention is cleaning agents, preferably dishwashing detergents, in particular automatic dishwashing detergents, which contain at least one organic solvent, in particular selected from 1,2-propanediol, 1,3-propanediol, glycerol, 1,1,1-trimethylolpropane, triethylene glycol, dipropylene glycol, polyethylene glycols and/or mixtures thereof, in the gel phase.

The at least one gel phase preferably comprises at least one polyhydric alcohol. In addition to the preparation of flowable gel phases, the at least one polyhydric alcohol enables the preparation of a dimensionally stable, non-flowable gel phase within a short setting time that is within 15 minutes or less, in particular 10 minutes or less. Polyhydric alcohols within the meaning of the present invention are hydrocarbons in which two, three, or more hydrogen atoms are replaced by OH groups. The OH groups are each bonded to different carbon atoms. No carbon atom has two OH groups. This is in contrast with (simple) alcohols, in which only one hydrogen atom is replaced by an OH group in hydrocarbons. Polyhydric alcohols having two OH groups are referred to as alkanediols, and polyhydric alcohols having three OH groups are referred to as alkanetriols. A polyhydric alcohol thus corresponds to general formula $[KW](OH)_X$, where KW represents a hydrocarbon that is linear or branched, saturated or unsaturated, substituted or unsubstituted. A substitution can occur with —SH or —NH groups, for example. Preferably, KW is a linear or branched, saturated or unsaturated, unsubstituted hydrocarbon. KW comprises at least two carbon atoms. The polyhydric alcohol comprises 2, 3, or more OH groups (x=2, 3, 4 . . . ), with only one OH group being bonded to each C atom of the KW. Particularly preferably, KW comprises 2 to 10, i.e. 2, 3, 4, 5, 6, 7, 8, 9, or 10, carbon atoms. Polyhydric alcohols in which x=2, 3, or 4 can be used in particular (for example, pentaerythritol where x=4). Preferably, x=2 (alkanediol) and/or x=3 (alkanetriol).

Particularly preferably, the at least one gel phase comprises at least one alkanetriol and/or at least one alkanediol, in particular at least one $C_3$ to $C_{10}$ alkanetriol and/or at least one $C_3$ to $C_{10}$ alkanediol, preferably at least one $C_3$ to $C_8$ alkanetriol and/or at least one $C_3$ to $C_8$ alkanediol, particularly at least one $C_3$ to $C_6$ alkanetriol and/or at least one $C_3$ to $C_5$ alkanediol, as a polyhydric alcohol. Preferably, it comprises an alkanetriol and an alkanediol as at least one polyhydric alcohol. In a preferred embodiment, the at least one gel phase thus comprises at least one polymer, in particular PVOH or PVOH with gelatin, as well as at least one alkanediol and at least one alkanetriol, in particular one alkanetriol and one alkanediol. A gel phase comprising at least one polymer, PVOH or PVOH with gelatin, and a $C_3$ to $C_8$ alkanediol and a $C_3$ to $C_8$ alkanetriol is equally preferred. A gel phase comprising at least one polymer, in particular PVOH or PVOH with gelatin, and a $C_3$ to $C_5$ alkanediol and a $C_3$ to $C_6$ alkanetriol is more preferred. According to the invention, the polyhydric alcohols do not comprise any derivatives thereof, such as ethers, esters, etc.

Surprisingly, it has been demonstrated that, when a corresponding triol (alkanetriol) is combined with a corresponding diol (alkanediol), particularly short setting times can be achieved. Furthermore, the gel phases that are obtained are transparent and have a shiny surface, which provides an attractive visual impression of the cleaning agent according to the invention. The terms "diol" and "alkanediol" are used synonymously herein. The same applies to "triol" and "alkanetriol."

According to a particularly preferred embodiment, the cleaning agents according to the invention, preferably dishwashing detergents, in particular automatic dishwashing detergents, contain the at least one organic solvent in the gel phase in quantities of from 30 to 90 wt. %, in particular from 40 to 85 wt. %, more preferably from 50 to 80 wt. %, based on the total weight of the gel phase.

The quantity of polyhydric alcohol or polyhydric alcohols used in gel phases according to the invention is preferably at least 45 wt. %, in particular 55 wt. % or more. Preferred quantity ranges are from 45 wt. % to 85 wt. %, in particular from 50 wt. % to 80 wt. %, based on the total weight of the gel phase.

Preferably, the $C_3$ to $C_6$ alkanetriol is glycerol and/or 2-ethyl-2-(hydroxymethyl)-1,3-propanediol (also called 1,1,1-trimethylolpropane) and/or 2-amino-2-(hydroxymethyl)-1,3-propanediol (TRIS, tris hydroxymethyl aminoethane) and/or 1,3,5-pentanetriol.

The $C_3$ to $C_6$ alkanetriol is particularly preferably glycerol and/or 2-ethyl-2-(hydroxymethyl)-1,3-propanediol (also called 1,1,1-trimethylolpropane). The $C_3$ to $C_5$ alkanediol is, for example, 1,5-pentanediol, 3-methyl-1,5-pentanediol, 1,4-butanediol, 1,3-propanediol and/or 1,2-propanediol, preferably 1,3-propanediol and/or 1,2-propanediol. Surprisingly, it has been found that the chain length of the diol as well as, in particular, the position of the OH groups has an influence on the transparency of the gel phase. The OH groups of the diol are therefore preferably not arranged on immediately adjacent C atoms. In particular, three or four carbon atoms, in particular 3 carbon atoms, are located between the two OH groups of the diol. Particularly preferably, the diol is 1,3-propanediol. Surprisingly, it has been found that particularly good results are obtained with mixtures that comprise glycerol and 1,3-propanediol and/or 1,2-propanediol.

According to the invention, polyethylene glycol(s) having an average molar mass of from 200 to 600 g/mol are preferably also used in the at least one gel phase or the gel phases. In combination with polyvinyl alcohol, polyethylene glycols with an average molar mass of between about 200 and about 600 g/mol, preferably between 300 and 500 g/mol, in particular between 350 and 450 g/mol, for example around 400 g/mol (INCI: PEG400), are used. Cleaning agent portions according to the invention are therefore characterized in that they comprise polyethylene glycol(s) having an average molar mass of from 300 to 500 g/mol, in particular from 350 to 450 g/mol.

In particular, it is advantageous for the at least one gel phase or gel phases, comprising, in each case based on the total weight of the gel phase, in addition to at least one water-soluble zinc salt, in particular zinc sulfate and/or zinc acetate, in particular zinc acetate (preferably in quantities of from 0.1 to 2.4 wt. %, particularly preferably from 0.2 to 1.0 wt. %), to contain polyvinyl alcohol and at least one polyhydric alcohol, and optionally additionally polyethylene glycols having an average molar mass of about 200 to 600 g/mol in quantities of from 5 to 30 wt. %, preferably from 8 to 26 wt. %, in particular from 10 to 22 wt. % based on the total weight of the at least one gel phase.

Surprisingly, it has been found that the addition of polyethylene glycols, in particular those having average molar masses of from 200 to 600 g/mol, to the at least one gel phase, in particular in gel phases comprising polyvinyl alcohol, leads to an acceleration of the solidification time of the gel phases. Values of a few minutes and even less than a minute can be achieved. This is highly advantageous, in particular for the production sequences, since the further processing of the gel phases in the solidified state can take place much more quickly and therefore usually more cost-effectively. Surprisingly, it has been found that the presence of polyethylene glycol(s) having an average molar mass of from 200 to 600 g/mol in combination with polyvinyl alcohol and/or derivatives thereof contributes significantly to reducing the setting times. Without being bound to the theory, it is assumed that such polyethylene glycols, in particular those having a molar mass of from 350 to 450 g/mol, in particular approximately 400 g/mol, increase the sol-gel temperature.

In a particularly preferred embodiment, the quantity of polyethylene glycol(s) having an average molar mass of from 350 to 450 g/mol, for example approximately 400 g/mol, is 10 to 22 wt. % based on the total weight of the gel phase.

A particularly preferred gel phase therefore comprises at least one water-soluble zinc salt, in particular zinc sulfate and/or zinc acetate, in particular zinc acetate (e.g. zinc acetate anhydrate), PVOH, polyethylene glycol(s) having an average molar mass of from 200 to 600 g/mol and 1,3-propanediol and glycerol or 1,1,1-trimethylolpropane as polyhydric alcohols. Here, a non-flowable consistency that is dimensionally stable at room temperature can be achieved within a setting time of 10 minutes or less that remains dimensionally stable even after an extended storage period. In addition, such a phase is transparent and has a shiny surface. A particularly preferred gel phase therefore comprises gelatin or PVOH as a polymer and 1,3-propanediol and glycerol or 1,1,1-trimethylolpropane as polyhydric alcohols.

If, in addition to at least one water-soluble zinc salt, in particular zinc sulfate and/or zinc acetate, in particular zinc acetate (preferably in quantities of from 0.1 to 2.4 wt. %, particularly preferably of from 0.2 to 1.0 wt. %), the gel phase comprises an alkanetriol, in particular glycerol or 1,1,1-trimethylolpropane, based in each case on the total weight of the gel phase, then the proportion of alkanetriol, in particular glycerol or 1,1,1-trimethylolpropane, based in each case on the total weight of the gel phase, is between 3 and 75 wt. % of the gel phase, preferably 5 wt. % to 70 wt. %, in particular 10 wt. % to 65 wt. %, in particular 20 wt. % to 40 wt. %.

If the gel phase optionally comprises a plurality of alkanetriol(s), then the proportion of alkanetriol(s) is between 3 and 75 wt. %, preferably 5 wt. % to 70 wt. %, in particular 10 wt. % to 65 wt. %, particularly 20 wt. % to 40 wt. %, based on the total weight of the gel phase.

If glycerol is contained as an alkanetriol in the gel phase, then the proportion of glycerol based on the total weight of the gel phase is preferably 5 wt. % to 70 wt. %, particularly 10 wt. % to 65 wt. %, particularly 20 wt. % to 40 wt. %.

If 1,1,1-trimethylolpropane is contained in the gel phase, then the proportion of 1,1,1-trimethylolpropane based on the total weight of the gel phase is preferably 5 wt. % to 70 wt. %, in particular 10 wt. % to 65 wt. %, particularly preferably 18 to 45 wt. %, particularly preferably 20 wt. % to 40 wt. %.

If 2-amino-2-hydroxymethyl-1,3-propanediol is present in the gel phase, the proportion of 2-amino-2-hydroxymethyl-1,3-propanediol, based on the total weight of the gel phase, is preferably 5 wt. % to 70 wt. %, in particular 10 wt. % to 65 wt. %, in particular 20 wt. % to 40 wt. %.

If several alkanediols are optionally present in the gel phase, the proportion of alkanediols, based on the total weight of the gel phase, is preferably 5 wt. % to 70 wt. %, in particular 7 wt. % to 65 wt. %, in particular 10 wt. % to 40 wt. %.

If, in addition to at least one water-soluble zinc salt, in particular zinc sulfate and/or zinc acetate, in particular zinc acetate (preferably in quantities of from 0.1 to 2.4 wt. %, particularly preferably of from 0.2 to 1.0 wt. %), the gel phase comprises at least one alkanediol, in particular 1,3-propanediol or 1,2-propanediol, based in each case on the total weight of the gel phase, the proportion of alkanediol, in particular 1,3-propanediol or 1,2-propanediol, based in particular on the total weight of the gel phase, is preferably 5 wt. % to 70 wt. %, in particular 10 wt. % to 65 wt. %, in particular 20 wt. % to 45 wt. %. If 1,3-propanediol is present in the gel phase, the proportion of 1,3-propanediol, based on the total weight of the gel phase, is in particular 10 wt. % to 65 wt. %, in particular 20 wt. % to 45 wt. %.

A gel phase is preferred which, in each case based on the total weight of the gel phase, contains, in addition to at least one water-soluble zinc salt, in particular zinc sulfate and/or zinc acetate, in particular zinc acetate (preferably in quantities of from 0.1 to 2.4 wt. %, particularly preferably from 0.2 to 1.0 wt. %), 20 to 45 wt. % 1,3-propanediol and/or 1,2-propanediol and 10 wt. % to 65 wt. % 2-amino-2-hydroxymethyl-1,3-propanediol, in each case based on the total weight of the gel phase. A gel phase containing 20 to 45 wt. % 1,3-propanediol and/or 1,2-propanediol and 10 to 65 wt. % 1,1,1-trimethylolpropane, in each case based on the total weight of the gel phase, is likewise preferred. In particular, a gel phase containing 20 to 45 wt. % 1,3-propanediol and/or 1,2-propanediol and 10 to 65 wt. % glycerol, in each case based on the total weight of the gel phase, is preferred. It was found that, in these ranges, quick setting of a gel phase is possible at 20° C. and yields phases that are stable in storage and transparent. In particular the proportion of glycerol has an effect on the curing time.

If the at least one gel phase according to the invention, based in each case on the total weight of the gel phase, has, in addition to at least one water-soluble zinc salt, in particular zinc sulfate and/or zinc acetate, in particular zinc acetate (preferably in quantities of from 0.1 to 2.4 wt. %, particularly preferably of from 0.2 to 1.0 wt. %), a $C_3$ to $C_6$ alkanetriol and a $C_3$ to $C_5$ alkanediol, their weight ratio is preferably from 3:1 to 1:2. In particular, the weight ratio is from 2:1 to 1:1.5, preferably from 1.5:1 to 1:1.2, preferably from 1.3 to 1:1, when glycerol and 1,3-propanediol are contained as polyhydric alcohols. Surprisingly, it has been found that, with these weight ratios, storage-stable, shiny, transparent gel phases can be obtained within short setting times of 10 minutes or less at 20° C. In combination with polyethylene glycols having an average molar mass of from 200 to 600 g/mol, the preferred above-mentioned weight ratios, in particular weight ratios ($C_3$ to $C_6$ alkanetriol:$C_3$ to $C_5$ alkanediol) of from 1.5:1 to 1:1.2, allow a reduction to setting times of 5 minutes or less.

According to another preferred embodiment, in addition to the above-mentioned alkanols, triethylene glycol may be present in the at least one gel phase, in particular the gel phases described above as being preferred, especially if this phase contains PVOH and optionally polyethylene glycols having an average molar mass of from 200 to 600 g/mol. Triethylene glycol advantageously accelerates the solidification of the gel phase(s). It also causes the resulting gel phase to exchange little, if any, liquid with the environment, in a manner that is not perceptible. This improves in particular the visual impression of the resulting cleaning agent portions. It is particularly preferred if the at least one gel phase, in each case based on the total weight of the gel phase, contains, in addition to at least one water-soluble zinc salt, in particular zinc sulfate and/or zinc acetate, in particular zinc acetate (preferably in quantities of 0.1 to 2.4 wt. %, more preferably from 0.2 to 1.0 wt. %), 1,3 and/or 1,2-propanediol, more preferably 1 to 3.5 wt. % 1,3-propanediol, and glycerol between 0.1 and 20 wt. %, preferably between 1 and 15 wt. %, in particular between 5 and 12 wt. %, for example 8 to 11 wt. % triethylene glycol.

Furthermore, the washing or cleaning agent according to the invention, in particular at least the at least one gel phase, preferably both the particulate phase and the gel phase, preferably comprises another anionic polymer, in particular polycarboxylate. These can act either as builders and/or as thickening polymers. According to the invention, the at least one gel phase can further comprise anionic polymers or copolymers having builder properties. This is preferably a polycarboxylate. A copolymeric polyacrylate, preferably a sulfopolymer, preferably a copolymeric polysulfonate, preferably a hydrophobically modified copolymeric polysulfonate, is preferably used as the polycarboxylate. The copolymers can have two, three, four, or more different monomer units. Preferred copolymeric polysulfonates contain, besides sulfonic acid group-containing monomer(s), at least one monomer from the group of unsaturated carboxylic acids.

According to a particularly preferred embodiment, the low-water gel phase contains a polymer comprising at least one sulfonic acid group-containing monomer.

As the unsaturated carboxylic acid(s), unsaturated carboxylic acids of formula $R^1(R^2)C{=}C(R^3)COOH$ are particularly preferably used, in which $R^1$ to $R^3$, independently of one another, represent —H, —$CH_3$, a straight-chain or branched saturated alkyl functional group having 2 to 12 carbon atoms, a straight-chain or branched, mono- or polyunsaturated alkenyl functional group having 2 to 12 carbon atoms, with —NH2, —OH, or —COOH substituted alkyl or alkenyl functional groups as defined above, or represent —COOH or —$COOR^4$, where $R^4$ is a saturated or unsaturated, straight-chain or branched hydrocarbon functional group having 1 to 12 carbon atoms.

Particularly preferred unsaturated carboxylic acids are acrylic acid, methacrylic acid, ethacrylic acid, α-chloroacrylic acid, α-cyanoacrylic acid, crotonic acid, α-phenylacrylic acid, maleic acid, maleic anhydride, fumaric acid, itaconic acid, citraconic acid, methylene malonic acid, sorbic acid, cinnamic acid, or mixtures thereof. Unsaturated dicarboxylic acids can obviously also be used.

For sulfonic acid group-containing monomers, those of formula $R^5(R^6)C{=}C(R^7)—X—SO_3H$ are preferred, in which $R^5$ to $R^7$, independently of one another, represent —H, —$CH_3$, a straight-chain or branched saturated alkyl functional group having 2 to 12 carbon atoms, a straight-chain or branched, mono- or polyunsaturated alkenyl functional group having 2 to 12 carbon atoms, with —$NH_2$, —OH, or —COOH substituted alkyl or alkenyl functional groups, or represent —COOH or —$COOR^4$, where $R^4$ is a saturated or unsaturated, straight-chain or branched hydrocarbon functional group having 1 to 12 carbon atoms, and X represents an optionally present spacer group that is selected from —$(CH_2)_n$, where n=0 to 4, —COO—$(CH_2)_k$—, where k=1 to 6, —C(O)—NH—$C(CH_3)_2$—, —C(O)—NH—$C(CH_3)_2$—$CH_2$— and —C(O)—NH—$CH(CH_3)$—$CH_2$—.

Among these monomers, those of formulas $H_2C{=}CH—X—SO_3H$, $H_2C{=}C(CH_3)—X—SO_3H$ or $HO_3S—X—(R^6)C{=}C(R^7)—X—SO_3H$ are preferred, in which $R^6$ and $R^7$, independently of one another, are selected from —H, —$CH_3$, —$CH_2CH_3$, —$CH_2CH_2CH_3$ and —$CH(CH_3)_2$, and X represents an optionally present spacer group that is selected from —$(CH_2)_n$—, where n=0 to 4, —COO—$(CH_2)_k$ —, where k=1 to 6, —C(O)—NH—$C(CH_3)_2$—, —C(O)—NH—$C(CH_3)_2$—$CH_2$— and —C(O)—NH—$CH(CH_3)$—$CH_2$—.

According to a particularly preferred embodiment, the gel phase comprises a polymer comprising, as a sulfonic acid group-containing monomer, acrylamidopropanesulfonic acids, methacrylamidomethylpropanesulfonic acids or acrylamidomethylpropanesulfonic acid.

Particularly preferred sulfonic acid group-containing monomers are 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxypropanesulfonic acid, allyl sulfonic acid, methallyl sulfonic acid, allyloxybenzene sulfonic acid, methallyloxybenzene sulfonic acid, 2-hydroxy-3-(2-propenyloxy)propanesulfonic acid, 2-methyl-2-propene-1-sulfonic acid, styrene sulfonic acid, vinylsulfonic acid, 3-sulfopropylacrylate, 3-sulfopropylmethacrylate, sulfomethacrylamide, sulfomethylmethacrylamide, as well as mixtures of the above acids or water-soluble salts thereof. The sulfonic acid groups can be present in the polymers fully or partially in neutralized form, i.e. the acidic hydrogen atom of the sulfonic acid group can be replaced in some or all of the sulfonic acid groups with metal ions, preferably alkali metal ions, and in particular with sodium ions. The use of partially or fully neutralized sulfonic acid group-containing copolymers is preferred according to the invention.

In copolymers that contain only carboxylic acid group-containing monomers and sulfonic acid group-containing monomers, the monomer distribution of the copolymers that are preferably used according to the invention is preferably 5 to 95 wt. % in each case; particularly preferably, the proportion of the sulfonic acid group-containing monomer is 50 to 90 wt. %, and the proportion of the carboxylic acid group-containing monomer is 10 to 50 wt. %, with the monomers preferably being selected from those mentioned above. The molar mass of the sulfo-copolymers that are preferably used according to the invention can be varied in order to adapt the properties of the polymers to the desired intended use. Preferred cleaning agents are characterized in that the copolymers have molar masses from 2,000 to 200,000 $g \cdot mol^{-1}$, preferably from 4,000 to 25,000 $g \cdot mol^{-1}$, and particularly from 5,000 to 15,000 $g \cdot mol^{-1}$.

In another preferred embodiment, the copolymers comprise not only carboxyl group-containing monomers and sulfonic acid group-containing monomers but also at least one non-ionic, preferably hydrophobic monomer. In particular the rinsing performance of dishwashing detergents according to the invention was able to be improved by using these hydrophobically modified polymers.

Particularly preferably, the at least one gel phase further comprises an anionic copolymer, a copolymer comprising i) carboxylic acid group-containing monomers
ii) sulfonic acid group-containing monomers
iii) non-ionic monomers, particularly hydrophobic monomers, being used as the anionic copolymer.

As the non-ionic monomers, monomers of general formula $R^1$ $(R^2)C{=}C(R^3)—X—R^4$ are preferably used, in which $R^1$ to $R^3$ represent, independently of one another, —H, —$CH_3$ or —$C_2H_5$, X represents an optionally present spacer group selected from —$CH_2$—, —C(O)O— und —C(O)—NH—, and $R^4$ represents a straight-chain or branched saturated alkyl functional group having 2 to 22 carbon atoms or an unsaturated, preferably aromatic functional group having 6 to 22 carbon atoms.

Particularly preferred non-ionic monomers are butene, isobutene, pentene, 3-methylbutene, 2-methylbutene, cyclopentene, hexene, hexene-1, 2-methlypentene-1, 3-methylpentene-1, cyclohexene, methylcyclopentene, cycloheptene, methylcyclohexene, 2,4,4-trimethylpentene-1, 2,4,4-trimethylpentene-2,2,3-dimethylhexene-1, 2,4-dimethylhexene-1, 2,5-dimethylhexene-1, 3,5-dimethylhexene-1, 4,4-dimethylhexane-1, ethylcyclohexene, 1-octene, α-olefins having 10 or more carbon atoms such as 1-decene, 1-dodecene, 1-hexadecene, 1-octadecene and $C_{22}$ α-olefin, 2-styrene, α-methylstyrene, 3-methylstyrene, 4-propylstyrene, 4-cyclohexylstyrene, 4-dodecylstyrene, 2-ethyl-4-benzylstyrene, 1-vinyl naphthalene, 2-vinyl naphthalene, acrylic acid methyl ester, acrylic acid ethyl ester, acrylic acid propyl ester, acrylic acid butyl ester, acrylic acid pentyl ester, acrylic acid hexyl ester, methacrylic acid methyl ester, N-(methyl)acrylamide, acrylic acid-2-ethylhexyl ester, methacrylic acid-2-ethylhexyl ester, N-(2-ethylhexyl)acrylamide, acrylic acid octyl ester, methacrylic acid octyl ester, N-(octyl)acrylamide, acrylic acid lauryl ester, methacrylic acid lauryl ester, N-(lauryl)acrylamide, acrylic acid stearyl ester, methacrylic acid stearyl ester, N-(stearyl)acrylamide, acrylic acid behenyl ester, methacrylic acid behenyl ester, and N-(behenyl)acrylamide or mixtures thereof, in particular acrylic acid, ethyl acrylate, 2-acrylamido-2-methylpropanesulfonic acid (AMPS) as well as mixtures thereof.

Surprisingly, PVOH and/or derivatives thereof together with anionic polymers or copolymers, in particular with sulfonic acid group-containing copolymers, have also been found to lead to the formation of gel phases with insensitive surfaces. Such surfaces can be touched by an end consumer without having material adhere to their hands. No erosion of material occurs in packaging either. The gel phase therefore preferably comprises PVOH, polyethylene glycol(s) having an average molar mass of 200 to 600 g/mol, at least one polyhydric alcohol, and an anionic copolymer/polymer. The proportion of the anionic polymer is preferably 1 wt. % to 35 wt. %, in particular 3 wt. % to 30 wt. %, in particular 4 wt. % to 25 wt. %, preferably 5 wt. % to 20 wt. %, for example 10 wt. %, based on the total weight of the gel phase. Sulfopolymers, in particular the preferred copolymeric polysulfonates, which, in addition to sulfonic acid group-containing monomer(s), also contain at least one monomer from the group of unsaturated carboxylic acids, in particular acrylic acid, also provide an excellent shine on the surface. What is more, fingerprints are not left behind. Therefore, the proportion of sulfopolymers, in particular the preferred copolymeric polysulfonates which contain not only sulfonic acid group-containing monomer(s) but also at least one monomer from the group of unsaturated carboxylic acids, in particular acrylic acid, in particular the proportion of said sulfopolymers having AMPS as a sulfonic acid group-containing monomer, for example Acusol 590, Acusol 588 or Sokalan CP50, is preferably 1 wt. % to 25 wt. %, in particular 3 wt. % to 18 wt. %, particularly 4 wt. % to 15 wt. %, preferably 5 wt. % to 12 wt. %, based on the weight of the gel phase. In a particularly preferred embodiment, therefore, the at least one gel phase comprises PVOH and a sulfopolymer, in particular the preferred copolymeric polysulfonates which contain not only sulfonic acid group-containing monomer(s) but also at least one monomer from the group of unsaturated carboxylic acids, in particular acrylic acid, and at least one polyhydric alcohol.

According to another embodiment, in addition to said polyethylene glycols having an average molar mass of from 200 to 600 g/mol, further polyalkylene glycols, in particular further polyethylene glycols, having an average molar mass of between approximately 800 and 8,000 may be contained in the at least one gel phase. The above-mentioned polyethylene glycols are particularly preferably used in quantities of from 1 to 40 wt. %, preferably from 5 to 35 wt. %, in particular from 10 to 30 wt. %, for example from 15 to 25 wt. %, preferably in each case based on the total weight of the gel phase.

Particularly preferred embodiments of the present invention comprise, as at least one gel phase, in each case based on the total weight of the gel phase, in addition to at least one water-soluble zinc salt, in particular zinc sulfate and/or zinc acetate, in particular zinc acetate (preferably in quantities of 0.2 to 1.0 wt. %), 8 to 22 wt. % PVOH, 15 to 40 wt. % 1,3-propanediol, 20 to 40 wt. % glycerol, 5 to 15 wt. % sulfonic acid group-containing polyacrylate copolymer, and 8 to 22 wt. %, in particular 10 to 20 wt. %, polyethylene glycol having an average molar mass of 200-600 g/mol, optionally 2 to 10 wt. % 1,2-propanediol, and optionally also 2-15 wt. % triethylene glycol, in each case based on the total weight of the gel phase. For a good incorporation ability of the zinc salts, in particular of zinc sulfate and/or zinc acetate, in particular of zinc acetate (e.g. in the water-free form of the salt) in low-water gel phases having carboxylate and/or sulfonic acid group-containing polymers, it is particularly preferred for the quantity of zinc salt in the water-free gel phase to be selected to be from 0.2 to 1.0 wt. %, for example 0.5 wt. %.

According to a further particularly preferred embodiment, the washing or cleaning agents according to the invention, in particular the particulate phase, contain at least one additional ingredient selected from the group consisting of builders, polymers, bleaching agents, bleach activators, bleach catalysts, enzymes, sequestering agents, electrolytes, corrosion inhibitors, glass corrosion inhibitors, suds suppressors, dyes, additives for improving the flow and drying behavior, disintegration agents, preservatives, pH adjusters, fragrances, and perfume carriers.

The use of builder substances (builders) such as silicates, aluminum silicates (in particular zeolites), salts of organic di- and polycarboxylic acids, as well as mixtures of these substances, preferably water-soluble builder substances, can be advantageous.

In an embodiment that is preferred according to the invention, the use of phosphates (including polyphosphates) is omitted either largely or completely. In this embodiment, the agent preferably contains less than 5 wt. %, particularly preferably less than 3 wt. %, in particular less than 1 wt. % phosphate(s). Particularly preferably, the agent in this embodiment is completely phosphate-free, i.e. the agents contain less than 0.1 wt. % phosphate(s).

The builders include, in particular, carbonates, citrates, phosphonates, organic builders, and silicates. The proportion by weight of the total builders with respect to the total weight of agents according to the invention is preferably 15 to 80 wt. % and in particular 20 to 70 wt. %.

Some examples of organic builders that are suitable according to the invention are the polycarboxylic acids (polycarboxylates) that can be used in the form of their sodium salts, with polycarboxylic acids being understood as being those carboxylic acids that carry more than one, in particular two to eight acid functions, preferably two to six, in particular two, three, four, or five acid functions in the entire molecule. As polycarboxylic acids, dicarboxylic acids, tricarboxylic acids, tetracarboxylic acids, and pentacarboxylic acids, in particular di-, tri-, and tetracarboxylic acids, are thus preferred. The polycarboxylic acids can also carry additional functional groups such as hydroxyl or amino groups, for example. For example, these include citric acid, adipic acid, succinic acid, glutaric acid, malic acid, tartaric acid, maleic acid, fumaric acid, sugar acids (preferably aldaric acids, for example galactaric acid and glucaric acid), aminocarboxylic acids, in particular aminodicarboxylic acids, aminotricarboxylic acids, aminotetracarboxylic acids such as nitrilotriacetic acid (NTA), glutamic-N,N-diacetic acid (also called N,N-bis(carboxymethyl)-L-glutamic acid or GLDA), methyl glycine diacetic acid (MGDA) and derivatives thereof and mixtures thereof. Preferred salts are the salts of the polycarboxylic acids such as citric acid, adipic acid, succinic acid, glutaric acid, tartaric acid, GLDA, MGDA, and mixtures thereof.

Other substances that are suitable as organic builders are polymeric polycarboxylates (organic polymers with a plurality of (in particular greater than ten) carboxylate functions in the macromolecule), polyaspartates, polyacetals, and dextrins.

Besides their building effect, the free acids also typically have the quality of an acidifying component. Particularly noteworthy here are citric acid, succinic acid, glutaric acid, adipic acid, gluconic acid, and any mixtures thereof.

Particularly preferred washing or cleaning agents according to the invention, in particular dishwashing detergents, preferably automatic dishwashing detergents, contain one or more salts of citric acid, i.e. citrates, as one of their essential builders. These are preferably contained in a proportion of from 2 to 40 wt. %, in particular from 5 to 30 wt. %, particularly from 7 to 28 wt. %, particularly preferably from 10 to 25 wt. %, very particularly preferably from 15 to 20 wt. %, in each case based on the total weight of the agent.

It is also particularly preferred to use carbonate(s) and/or hydrogen carbonate(s), preferably alkali carbonate(s), particularly preferably sodium carbonate (soda), in quantities of from 2 to 50 wt. %, preferably from 4 to 40 wt. %, and in particular from 10 to 30 wt. %, very particularly preferably from 10 to 24 wt. %, in each case based on the weight of the agent.

Particularly preferred washing or cleaning agents according to the invention, in particular dishwashing detergents, preferably automatic dishwashing detergents, are characterized in that they contain at least two builders from the group of silicates, phosphonates, carbonates, aminocarboxylic acids, and citrates, with the proportion by weight of these builders based on the total weight of the cleaning agent according to the invention being preferably 5 to 70 wt. %, more preferably 15 to 60 wt. %, and in particular 20 to 50 wt. %. The combination of two or more builders from the above-mentioned group has proven advantageous for the cleaning and rinsing performance of washing or cleaning agents according to the invention, in particular dishwashing detergents, preferably automatic dishwashing detergents. Beyond the builders mentioned here, one or more other builders can be additionally contained.

Preferred washing or cleaning agents, in particular dishwashing detergents, preferably automatic dishwashing detergents, are characterized by a builder combination of citrate and carbonate and/or hydrogen carbonate. In one embodiment that is very particularly preferred according to the invention, a mixture of carbonate and citrate is used in which the quantity of carbonate is preferably 5 to 40 wt. %, in particular 10 to 35 wt. %, very particularly preferably 15 to 30 wt. %, and the quantity of citrate is preferably 5 to 35 wt. %, in particular 10 to 25 wt. %, very particularly preferably 15 to 20 wt. %, in each case based on the total quantity of the cleaning agent, with the total quantity of these two builders preferably being 20 to 65 wt. %, in particular 25 to 60 wt. %, preferably 30 to 50 wt. %. Moreover, one or more other builders can be additionally contained.

The washing or cleaning agents according to the invention, in particular dishwashing detergents, preferably automatic dishwashing detergents, can contain phosphonates in particular as an additional builder. A hydroxy alkane and/or amino alkane phosphonate is preferably used as a phosphonate compound. Among the hydroxy alkane phosphonates, 1-hydroxyethane-1,1-diphosphonate (HEDP) has particular significance. Possible preferable aminoalkane phosphonates include ethylenediamine tetramethylene phosphonate (EDTMP), diethylenetriamine pentamethylene phosphonate (DTPMP) and the higher homologues thereof. Phosphonates are preferably contained in the agents according to the invention in quantities of from 0.1 to 10 wt. %, in particular in quantities of from 0.5 to 8 wt. %, very particularly preferably from 2.5 to 7.5 wt. %, in each case based on the total weight of the agent.

The combined use of citrate, (hydrogen) carbonate, and phosphonate is particularly preferred. These can be used in the above-mentioned quantities. In particular, quantities of 10 to 25 wt. % citrate, 10 to 30 wt. % carbonate (or hydrogen carbonate), and 2.5 to 7.5 wt. % phosphonate are used in this combination, in each case based on the total weight of the agent.

Additional particularly preferred washing or cleaning agents, in particular dishwashing detergents, preferably automatic dishwashing detergents, are characterized in that, in addition to citrate and (hydrogen) carbonate and, optionally, phosphonate, they contain at least one additional phosphorus-free builder. In particular, it is selected from aminocarboxylic acids, with the additional phosphorus-free builder preferably being selected from methyl glycine diacetic acid (MGDA), glutamic acid diacetate (GLDA), aspartic acid diacetate (ASDA), hydroxyethyliminodiacetate (HEIDA), iminodisuccinate (IDS), and ethylenediamine disuccinate (EDDS), particularly preferably from MGDA or GLDA. An example of a particularly preferred combination is citrate, (hydrogen) carbonate, and MGDA as well as, optionally, phosphonate.

The proportion by weight of the additional phosphorus-free builder, in particular of the MGDA and/or GLDA, is preferably from 0 to 40 wt. %, in particular from 5 to 30 wt. %, more particularly from 7 to 25 wt. %. The use of MGDA or GLDA, in particular MGDA, as granular material is particularly preferred. Advantageous in this regard is MGDA granular material that contains as little water as possible and/or has a lower hygroscopicity (water absorption at 25° C., normal pressure) than non-granulated powders. The combination of at least three, in particular at least four, builders from the above-mentioned group has proven advantageous for the cleaning and rinsing performance of cleaning agents according to the invention, in particular dishwashing detergents, preferably automatic dishwashing detergents. Besides those, additional builders can also be contained.

Polymeric polycarboxylates are also suitable as organic builders. These are, for example, the alkali metal salts of polyacrylic acid or polymethacrylic acid, for example those having a relative molecular mass of from 500 to 70,000 g/mol. Suitable polymers are in particular polyacrylates which preferably have a molecular mass of from 1,000 to 20,000 g/mol. Due to their superior solubility, the short-chain polyacrylates, which have molar masses of from 1,100 to 10,000 g/mol, and particularly preferably from 1,200 to 5,000 g/mol, can in turn be preferred from this group.

The (homo)polymeric polycarboxylates contained in the washing or cleaning agents according to the invention, in particular dishwashing detergent, preferably automatic dishwashing detergent, amount to preferably from 0.5 to 20 wt. %, more preferably from 2 to 15 wt. %, and in particular from 4 to 10 wt. %.

Detergents or cleaning agents according to the invention, in particular dishwashing detergents, preferably automatic dishwashing detergents, can also contain, as a builder, crystalline layered silicates of general formula $NaMSi_xO_{2x+1}\cdot yH_2O$, where M represents sodium or hydrogen, x is a number from 1.9 to 22, preferably from 1.9 to 4, with 2, 3, or 4 being particularly preferred values for x, and y represents a number from 0 to 33, preferably from 0 to 20. It is also possible to use amorphous sodium silicates with a modulus $Na_2O:SiO_2$ of 1:2 to 1:3.3, preferably of 1:2 to 1:2.8 and in particular of 1:2 to 1:2.6, which are preferably delayed in dissolution and have secondary washing properties.

In certain washing or cleaning agents according to the invention, in particular dishwashing detergents, preferably automatic dishwashing detergents, the silicate content, based on the total weight of the washing or cleaning agent, is limited to quantities below 10 wt. %, preferably below 5 wt. %, and in particular below 2 wt. %.

In addition to the aforementioned builders, the washing or cleaning agents according to the invention can also contain alkali metal hydroxides. These alkali carriers are preferably used in the washing or cleaning agents and in particular in the at least one gel phase only in small quantities, preferably in quantities below 10 wt. %, preferably below 6 wt. %, more preferably below 5 wt. %, particularly preferably between 0.1 and 5 wt. %, and in particular between 0.5 and 5 wt. %, in each case based on the total weight of the washing or cleaning agent. Alternative washing or cleaning agents according to the invention are free of alkali metal hydroxides.

As an additional component, cleaning agents according to the invention preferably contain enzyme(s) in the at least one particulate and/or the at least one gel phase. These include, in particular, proteases, amylases, lipases, hemicellulases, cellulases, perhydrolases, or oxidoreductases, as well as, preferably, mixtures thereof. Said enzymes are in principle of natural origin; proceeding from the natural molecules, improved variants for use in cleaning agents are available which are preferably used accordingly. Cleaning agents according to the invention preferably contain enzymes in total quantities of from $1\times10^{-6}$ wt. % to 5 wt. % based on active protein. The protein concentration can be determined with the aid of known methods, for example the BCA method or the Biuret method.

Among the proteases, the subtilisin-type proteases are preferred. Examples of these are the subtilisins BPN' and Carlsberg, as well as the further developed forms thereof, protease PB92, subtilisins 147 and 309, the alkaline protease from *Bacillus lentus*, subtilisin DY, and the enzymes thermitase, proteinase K and proteases TW3 and TW7, which belong to the subtilases but no longer to the subtilisins in the narrower sense.

Examples of amylases that can be used according to the invention are α-amylases from *Bacillus licheniformis*, from *B. amyloliquefaciens*, from *B. stearothermophilus*, from *Aspergillus niger*, and *A. oryzae*, as well as the further developments of said amylases that have been improved for use in cleaning agents. Furthermore, the α-amylases from *Bacillus* sp. A 7-7 (DSM 12368) and cyclodextrin glucanotransferase (CGTase) from *B. agaradherens* (DSM 9948) are particularly noteworthy for this purpose.

Furthermore, lipases or cutinases can be used according to the invention, in particular due to their triglyceride-cleaving activities, but also in order to produce peracids in situ from suitable precursors. These include, for example, the lipases that could originally be obtained from *Humicola lanuginosa* (*Thermomyces lanuginosus*) and those that have been further developed, particularly those with the amino acid exchange in positions D96LT213R and/or N233R, particularly preferably all of the exchanges D96L, T213R, and N233R.

Moreover, enzymes can be used which can be grouped together under the term "hemicellulases." These include, for example, mannanases, xanthan lyases, pectin lyases (=pectinases), pectinesterases, pectate lyases, xyloglucanases (=xylases), pullulanases, and β-glucanases.

In order to increase the bleaching effect, oxidoreductases such as oxidases, oxygenases, catalases, peroxidases such as halo-, chloro-, bromo-, lignin, glucose, or manganese peroxidases, dioxygenases or laccases (phenoloxidases, polyphenoloxidases) can be used according to the invention. Advantageously, organic, particularly preferably aromatic compounds that interact with the enzymes are additionally added in order to potentiate the activity of the relevant oxidoreductases (enhancers) or, in the event of greatly differing redox potentials, to ensure the flow of electrons between the oxidizing enzymes and the contaminants (mediators). A protein and/or enzyme can be protected, especially during storage, against damage such as inactivation, denaturing, or decomposition caused for example by physical influences, oxidation or proteolytic cleavage. When the proteins and/or enzymes are obtained microbially, it is particularly preferable for proteolysis to be inhibited, particularly if the agents also contain proteases. Cleaning agents may contain stabilizers for this purpose; the provision of such agents constitutes a preferred embodiment of the present invention.

Cleaning-active proteases and amylases are generally not made available in the form of the pure protein, but rather in the form of stabilized, storable and transportable preparations. These ready-made preparations include, for example, the solid preparations obtained through granulation, extrusion, or lyophilization or, particularly in the case of liquid or gel-type agents, solutions of the enzymes, advantageously maximally concentrated, having little water, and/or supplemented with stabilizers or other auxiliaries.

Alternatively the enzymes can also be encapsulated for the at least one particulate and/or the at least one gel phase, for example by spray-drying or extrusion of the enzyme solution together with a preferably natural polymer or in the form of capsules, for example those in which the enzymes are enclosed in a set gel, or in those of the core-shell type in which an enzyme-containing core is coated with a water-, air-, and/or chemical-impermeable protective layer. In the case of overlaid layers, other active ingredients, such as stabilizers, emulsifiers, pigments, bleaching agents, or dyes, can be additionally applied. Such capsules are applied using inherently known methods, for example by shaking or roll granulation or in fluidized bed processes. Such granular materials are advantageously low in dust, for example due to the application of polymeric film-formers, and stable in storage due to the coating.

Moreover, it is possible to formulate two or more enzymes together, so that a single granulate exhibits a plurality of enzyme activities.

As is clear from the preceding remarks, the enzyme protein forms only a fraction of the total weight of conventional enzyme preparations. Protease and amylase preparations that are used according to the invention contain between 0.1 and 40 wt. %, preferably between 0.2 and 30 wt. %, particularly preferably between 0.4 and 20 wt. %, and in particular between 0.8 and 10 wt. % of the enzyme protein. In particular, those cleaning agents are preferred which contain, based on the total weight thereof, 0.1 to 12 wt. %, preferably 0.2 to 10 wt. %, and particularly 0.5 to 10 wt. % of the respective enzyme preparations.

Besides the components cited above, the at least one particulate and/or the at least one gel phase of the washing or cleaning agent according to the invention can contain additional ingredients. These include, for example, anionic, cationic and/or amphoteric surfactants, bleaching agents, bleach activators, bleaching catalysts, other solvents, thickeners, sequestering agents, electrolytes, corrosion inhibitors, in particular silver protecting agents, glass corrosion inhibitors, suds suppressors, dyes, fragrances (in particular in the at least one solid phase), additives for improving the flow and drying behavior, for adjusting the viscosity, for stabilization, UV stabilizers, pearlescing agents, preservatives, antimicrobial active substances (disinfectants), pH adjusting agents in quantities of usually not more than 5 wt. %.

Agents according to the invention preferably contain at least one alkanolamine as an additional solvent. The alkanolamine is preferably selected from the group consisting of mono-, di-, triethanol- and propanolamine and mixtures thereof. The alkanolamine is preferably contained in agents according to the invention in a quantity of from 0.5 to 10 wt. %, in particular in a quantity of from 1 to 6 wt. %. In a preferred washing or cleaning agent, the at least one gel phase is free of alkanolamine, and the alkanolamine is contained only in the at least one particulate phase.

In a preferred embodiment, washing or cleaning agents according to the invention, in particular dishwashing detergents, contain, as an additional component, at least one zinc salt as a glass corrosion inhibitor. The zinc salt can be an inorganic or organic zinc salt. The zinc salt to be used according to the invention preferably has a solubility in water of greater than 100 mg/l, preferably greater than 500 mg/l, particularly preferably greater than 1 g/l, and particularly greater than 5 g/l (all solubilities at 20° C. water temperature). The inorganic zinc salt is preferably selected from the group consisting of zinc bromide, zinc chloride, zinc iodide, zinc nitrate, and zinc sulfate. The organic zinc salt is preferably selected from the group consisting of zinc salts of monomeric or polymeric organic acids, particularly from the group of zinc acetate, zinc acetyl acetonate, zinc benzoate, zinc formate, zinc lactate, zinc gluconate, zinc ricinoleate, zinc abietate, zinc valerate, and zinc-p-toluene sulfonate. In an embodiment that is particularly preferred according to the invention, zinc acetate is used as a zinc salt. The zinc salt is preferably contained in cleaning agents according to the invention in a quantity of from 0.01 wt. % to 5 wt. %, particularly preferably in a quantity of from 0.05 wt. % to 3 wt. %, in particular in a quantity of from 0.1 wt. % to 2 wt. %, based on the total weight of the cleaning agent. In addition or alternatively to the above-mentioned salts (in particular the zinc salts), polyethyleneimines such as those which are available under the name Lupasol® (BASF) are preferably used as glass corrosion inhibitors in a quantity of from 0 to 5 wt. %, in particular from 0.01 to 2 wt. %.

Polymers that are suitable as additives are in particular maleic acid acrylic acid copolymer Na salt (for example, Sokalan® CP 5 by BASF, Ludwigshafen (Germany)), modified polyacrylic acid Na salt (for example, Sokalan® CP 10 by BASF, Ludwigshafen (Germany)), modified polycarboxylate Na salt (for example, Sokalan® HP 25 by BASF, Ludwigshafen (Germany)), polyalkylene oxide, modified heptamethyltrisiloxane (for example, Silwet® L-77 by BASF, Ludwigshafen (Germany)), polyalkylene oxide, modified heptamethyltrisiloxane (for example, Silwet® L-7608 by BASF, Ludwigshafen (Germany)), as well as polyethersiloxane (copolymers of polymethyl siloxanes with ethylene oxide/propylene oxide segments (polyether blocks)), preferably water-soluble, linear polyether siloxanes with terminal polyether blocks, such as Tegopren® 5840, Tegopren® 5843, Tegopren® 5847, Tegopren® 5851, Tegopren® 5863, or Tegopren® 5878 by Evonik, Essen (Germany). Builder substances suitable as additives are in particular polyaspartic acid Na salt, ethylene diamine triacetate cocoalkyl acetamide (for example Rewopol® CHT 12 from Evonik, Essen (Germany)), methylglycine tri-Na diacetic acid salt and acetophosphonic acid. In the case of Tegopren® 5843 and Tegopren® 5863, mixtures with surface-active or polymeric additives exhibit synergies. However, the use of Tegopren types 5843 and 5863 on hard surfaces made of glass, in particular glass dishes, is less preferred, since these silicone surfactants can adhere to glass. In a particular embodiment of the invention, the above-mentioned additives are omitted.

A preferred washing or cleaning agent, in particular dishwashing detergent, preferably also comprises a bleaching agent, in particular an oxygen bleaching agent, as well as, optionally, a bleach activator and/or bleach catalyst. Insofar as they are present, they are contained exclusively in the at least one particulate phase.

As a preferred bleaching agent, cleaning agents according to the invention contain an oxygen bleaching agent from the group of sodium percarbonate, sodium perborate tetrahydrate, and sodium perborate monohydrate. Further examples of bleaching agents which may be used are peroxypyrophosphates, citrate perhydrates as well as $H_2O_2$-yielding peracid salts or peracids, such as perbenzoates, peroxophthalates, diperazelaic acid, phthaloiminoperacid or diperdodecane diacid. Moreover, bleaching agents from the group of the organic bleaching agents can also be used. Typical organic bleaching agents are the diacyl peroxides, such as dibenzoyl peroxide. Other typical organic bleaching agents are the peroxy acids, with the alkylperoxy acids and the arylperoxy acids meriting special mention as examples. Due to its good bleaching performance, sodium percarbonate is particularly preferred. One particularly preferred oxygen bleaching agent is sodium percarbonate.

Compounds which, under perhydrolysis conditions, result in aliphatic peroxocarboxylic acids having preferably 1 to 10 C atoms, in particular 2 to 4 C atoms, and/or optionally substituted perbenzoic acid, may be used as bleach activators. Substances that carry the O- and/or N-acyl groups of the stated number of C atoms and/or optionally substituted benzoyl groups are suitable. Multiply acylated alkylene diamines are preferred, with tetraacetylethyl ethylenediamine (TAED) having proven to be particularly suitable.

The bleach catalysts are bleach-boosting transition metal salts or transition metal complexes such as, for example, Mn-, Fe-, Co-, Ru-, or Mo-salene complexes or -carbonyl complexes. Mn-, Fe-, Co-, Ru-, Mo-, Ti-, V-, and Cu-complexes with N-containing tripod ligands as well as Co-, Fe- Cu-, and Ru-ammine complexes can also be used as bleach catalysts. Complexes of manganese in the oxidation stage II, III, IV, or IV are particularly preferably used which preferably contain one or more macrocyclic ligands with the donor functions N, NR, PR, O and/or S. Preferably, ligands are used which have nitrogen donor functions. It is particularly preferred to use bleach catalyst(s) in the agents according to the invention which contains or contain, as macromolecular ligands, 1,4,7-trimethyl-1,4,7-triazacyclononane (Me-TACN), 1,4,7-triazacyclononane (TACN), 1,5,9-trimethyl-1,5,9-triazacyclododecane (Me-TACD), 2-methyl-1-1,4,7-trimethyl-1,4,7-triazacyclononane (Me/Me-TACN), and/or 2-methyl-1,4,7-triazacyclononane (Me/TACN). Suitable manganese complexes are, for example, $[Mn^{III}_2(\mu\text{-}O)_i(\mu\text{-}OAc)_2(TACN)_2](ClO_4)_2$, $[Mn^{III}Mn^{IV}(\mu\text{-}O)_2(\mu\text{-}OAc)_i(TACN)_2](BPh_4)_2$, $[Mn^{IV}_4(\mu\text{-}O)_6(TACN)_4](ClO_4)_4$, $[Mn^{III}_2(\mu\text{-}O)_i(\mu\text{-}OAc)_2(Me\text{-}TACN)_2](ClO_4)_2$, $[Mn^{III}Mn^{IV}(\mu\text{-}O)_i(\mu\text{-}OAc)_2(Me\text{-}TACN)_2](ClO_4)_3$, $[Mn^{IV}_2(\mu\text{-}O)_3(Me\text{-}TACN)_2](PF_6)_2$ und $[Mn^{IV}_2(\mu\text{-}O)_3(Me/Me\text{-}TACN)_2](PF_6)_2$ (where $OAc{=}OC(O)CH_3$).

When benzoic acid, salicylic acid, or lactic acid are used as pH regulators and/or buffer substances, these compounds can support or boost the antibacterial effect of the silver and/or of the silver compound.

The washing or cleaning agent according to the invention comprises at least one particulate phase and at least one gel phase. The washing or cleaning agent can thus have one, two, three, or more different particulate phases; it may also have one, two, three or more different gel phases. The washing or cleaning agent according to the invention preferably comprises a particulate phase and a gel phase. Particularly preferably, the washing or cleaning agent comprises two particulate phases and one gel phase. It preferably comprises two particulate phases and two gel phases. An embodiment is also preferred in which the washing or cleaning agent comprises three particulate phases and one or two gel phases.

In this case, the weight ratio of the entirety of the at least one particulate phase to the entirety of the at least one gel phase is usually 40:1 to 2:1, in particular 20:1 to 4:1, preferably 12:1 to 6:1, for example 10:1 to 8:1. The total weight of all the phases in a cleaning agent portion can be between 8 and 30 g, in particular 10 to 25 g, preferably 12 to 21 g, for example 14 to 16 g per washing or cleaning agent portion. This weight ratio provides a good concentration of the respective ingredients of the particulate and gel phase in a cleaning process.

According to the invention, the at least one particulate phase and the at least one gel phase are adjacent to one another over all or part of their surfaces. It is preferred in this regard that the two phases be immediately adjacent.

If the at least one particulate phase and the at least one gel phase are directly adjacent to each other over all or part of their surfaces, stability is important in addition to the shortest possible solidification time of the at least one gel phase. Here, stability means that components contained in the gel phase do not cross over into the at least one particulate phase, but rather the at least one particulate phase and the at least one gel phase remain visually separate from one another even after a long period of storage and do not interact with each other, for example by the diffusion of liquid components from one phase to the other or the reaction of components of one phase with those in the other phase.

Surprisingly, it has been found that this can be made possible by a gel phase that comprises polyethylene glycols having an average molar mass of from 200 to 600 g/mol, glycerol, PVOH and at least one $C_3$ to $C_5$ alkanediol.

According to a particularly preferred embodiment, the washing or cleaning agents according to the invention are characterized in that the at least one gel phase comprises less than 1 wt. %, in particular less than 0.5 wt. %, in particular less than 0.1 wt. %, anionic surfactant, in each case based on the total weight of the gel phase. The at least one gel phase is preferably substantially free of anionic surfactants. Substantially free means that the at least one second phase comprises less than 0.05 wt. % anionic surfactant, in each case based on the total weight of the second phase.

It has been found in this context that the presence of 1 wt. % anionic surfactant in the at least one gel phase leads to poorer foaming behavior and poorer rinsing behavior of the overall composition. Furthermore, higher quantities of anionic surfactants adversely affect the curing.

In addition to the surfactants, the agent according to the invention, in particular the at least one gel phase, may further comprise sugar. According to the invention, sugars include sugar alcohols, monosaccharides, disaccharides, and oligosaccharides. In a preferred embodiment, the at least one gel phase comprises at least one sugar alcohol, preferably mannitol, isomalt, lactitol, sorbitol, threitol, erythritol, arabitol, and xylitol. Xylitol is particularly preferred.

In another embodiment, the agent according to the invention, in particular the at least one gel phase, may comprise disaccharides, in particular sucrose. The proportion of sucrose is 0 wt. % to 30 wt. %, in particular 5 wt. % to 25 wt. %, particularly preferably 10 wt. % to 20 wt. %, based on the weight of the gel phase. In greater quantities, the sugar does not dissolve completely in the gel phase and results in the clouding thereof. By using sugar, in particular in a proportion of from 10 wt. % to 15 wt. %, the development of moisture is reduced and the adhesion to the at least one particulate phase is thus improved.

The washing or cleaning agent portion according to the invention preferably comprises a washing or cleaning agent according to the invention in a water-soluble wrapping. The water-soluble wrapping is preferably made from a water-soluble film material, which is selected from the group consisting of polymers or polymer mixtures. The wrapping may be made up of one or of two or more layers of the water-soluble film material. The water-soluble film material of the first layer and of the additional layers, if present, may be the same or different.

It is preferable for the water-soluble wrapping to contain polyvinyl alcohol or a polyvinyl alcohol copolymer. Water-soluble wrappings containing polyvinyl alcohol or a polyvinyl alcohol copolymer exhibit good stability with a sufficiently high level of water solubility, in particular cold-water solubility.

Suitable water-soluble films for producing the water-soluble wrapping are preferably based on a polyvinyl alcohol or a polyvinyl alcohol copolymer of which the molecular weight is in the range of from 10,000 to 1,000,000 $gmol^{-1}$, preferably 20,000 to 500,000 $gmol^{-1}$, particularly preferably 30,000 to 100,000 $gmol^{-1}$ and in particular 40,000 to 80,000 $gmol^{-1}$.

Polyvinyl alcohol is usually produced by hydrolysis of polyvinyl acetate, since the direct synthesis route is not possible. The same applies to polyvinyl alcohol copolymers, which are prepared accordingly from polyvinyl acetate copolymers. It is preferable for at least one layer of the water-soluble wrapping to include a polyvinyl alcohol of which the degree of hydrolysis is 70 to 100 mol. %, preferably 80 to 90 mol. %, particularly preferably 81 to 89 mol. %, and in particular 82 to 88 mol. %.

In a preferred embodiment, the water-soluble packaging consists of at least 20 wt. %, particularly preferably at least 40 wt. %, very particularly preferably at least 60 wt. %, and in particular at least 80 wt. % of a polyvinyl alcohol of which the degree of hydrolysis is 70 to 100 mol. %, preferably 80 to 90 mol. %, particularly preferably 81 to 89 mol. %, and in particular 82 to 88 mol. %.

In addition, a polymer selected from the group including (meth)acrylic acid-containing (co)polymers, polyacrylamides, oxazoline polymers, polystyrene sulfonates, polyurethanes, polyesters, polyethers, polylactic acid or mixtures of said polymers may be added to a polyvinyl alcohol-containing film material that is suitable for producing the water-soluble wrapping. Polylactic acids are a preferred additional polymer.

Preferred polyvinyl alcohol copolymers include, in addition to vinyl alcohol, dicarboxylic acids as further monomers. Suitable dicarboxylic acids are itaconic acid, malonic acid, succinic acid and mixtures thereof, with itaconic acid being preferred. Polyvinyl alcohol copolymers which include, in addition to vinyl alcohol, an ethylenically unsaturated carboxylic acid, or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester or mixtures thereof.

It may be preferable for the film material to contain further additives. The film material may contain plasticizers such as dipropylene glycol, ethylene glycol, diethylene glycol, propylene glycol, glycerol, sorbitol, mannitol or mixtures thereof, for example. Further additives include for example release aids, fillers, cross-linking agents, surfactants, anti-oxidants, UV absorbers, anti-blocking agents, anti-adhesive agents or mixtures thereof.

Suitable water-soluble films for use in the water-soluble wrappings of the water-soluble packaging according to the invention are films which are sold by MonoSol LLC, for example under the names M8720, M8630, M8312, M8440, M7062, C8400 or M8900. Films which are sold under the names SH2601, SH2504, SH2707 or SH2701 by Nippon Gohsei are also suitable. Other suitable films include films having the names Solublon® PT, Solublon® GA, Solublon® KC or Solublon® KL from Aicello Chemical Europe GmbH, or the VF-HP films from Kuraray.

The water-soluble wrapping preferably has, at least in part, a bitter principle having a bitter value of between 1,000 and 200,000, especially those selected from quinine sulfate (bitter value=10,000), naringin (bitter value=10,000), sucrose octaacetate (bitter value=100,000), quinine hydrochloride and mixtures thereof. In particular, the outer surface of the water-soluble wrapping is coated at least in part with a bitter principle having a bitter value of between 1,000 and 200,000. In this connection, it is particularly preferable for the water-soluble wrapping to be coated by at least 50%, preferably at least 75%, and very particularly preferably at least 90%, with the bitter principle having a bitter value of between 1,000 and 200,000. The application of the bitter principle having a bitter value of between 1,000 and 200,000 can take place for example by means of printing, spraying or spreading.

According to the invention, the water-soluble wrapping has at least one continuous peripheral sealing seam that lies substantially in one plane. This is favorable from a process point of view since only a single sealing step, possibly using only a single sealing tool, is required for a peripheral sealing seam that lies substantially in one plane. The continuous peripheral sealing seam leads to better closure compared with those wrappings having a plurality of sealing seams and to excellent sealing of the sealed seam and thus of the wrapping itself. Leakage of product out of the wrapping, e.g. on the surface of the portion, would be detrimental as the consumer would then come into contact with the product. Precisely this situation should be avoided as far as possible with a washing or cleaning agent portion comprising a water-soluble wrapping.

The water-soluble wrapping may preferably be produced from at least two packaging parts. Preferably, the at least two packaging parts are water-soluble, so that no packaging parts remain in the dishwasher, which can then lead to problems in the dishwasher. The at least two packaging parts do not have to be different. They may preferably be produced from the same material and in the same way. In a preferred embodiment, these are two parts of a water-soluble film, in particular two parts of a water-soluble film of the same composition.

In another embodiment, the at least two packaging parts can be made of different materials, e.g. of different films or of material having two different properties (e.g. film that is soluble in hot and cold water). In this embodiment, it is preferable for a water-soluble film and another packaging part made by injection molding to be combined.

According to a particularly preferred embodiment of the present invention, the water-soluble wrapping comprises at least one at least partly plastically deformed film. In particular, this plastic deformation of the film can be produced by methods known to a person skilled in the art, such as deep-drawing (with and without application of a vacuum), blowing or stamping. In particular, the water-soluble wrapping comprises at least one at least partly plastically deformed film which has been produced by deep-drawing. The at least one particulate phase and the at least one gel phase can be arranged within the water-soluble wrapping in any desired combination with respect to one another. For instance, a particulate phase may be arranged on or beside a gel phase. In this embodiment, the washing or cleaning agent according to the invention comprises one particulate phase and one gel phase. It is also conceivable that a particulate phase is surrounded by gel phases. Embedding one phase into another is also covered according to the invention. In a further, particularly preferred arrangement, the gel phase is in cast form, for example in the form of a gel core, and is surrounded by the particulate phase. Two or more cavities that are separated from one another can also be present which are filled with the at least one gel phase. In this embodiment, the washing or cleaning agent comprises two gel phases, it being possible for the two gel phases to have different compositions.

According to a preferred embodiment, three, four, five or six or more cavities that are separated from one another are present which are filled with one or more of the gel phases. Preferably, those washing or cleaning agents comprise three, four, five or six or more gel phases, it being possible for said gel phases to have the same or different compositions.

According to a particularly preferred embodiment, the washing or cleaning agent portion according to the invention is characterized in that it contains a dishwashing detergent, in particular a dishwashing detergent for the automatic cleaning of dishes.

The present invention also relates to a method for preparing washing and/or cleaning agent portions that contain a product comprising at least one particulate phase, comprising:

a) providing a mold having at least one mold cavity, optionally containing at least one partition for dividing the base of the mold cavity;
b) adding a water-soluble film to the mold cavity;
c) forming at least one open chamber in the mold cavity by deforming the water-soluble film;
d) optionally filling the open chamber with at least one gel phase;
e) filling the open chamber with at least one particulate phase;
f) optionally filling the open chamber with at least one additional composition;
g) providing a second water-soluble film as a cover;
h) superimposing the open chamber and the cover in order to seal the portion pack at a sealing region;
i) sealing the cover with the open chamber.

The mold comprises at least one cavity (mold cavity). For example, the mold may be provided as a single mold or as part of an array of molds in the form of a conveyor belt, as is known from the conveyor belt method and from the drum method. The mold comprises a region on which the film can be placed, e.g. a seal region which is typically defined around the opening in a mold cavity. The mold cavity can have different geometries; if there are edges, it is advantageous for them to be rounded. Rounded edges and/or dome-shaped cavities are designed to ensure that the film is pulled somewhat more homogeneously upon being pulled into the cavity, thereby keeping the film thickness uniform in this respect, and to ensure that no breakage or tear points are produced, which in turn results in a more stable portion pack.

Optionally, but according to a particular embodiment preferably, the mold contains at least one mold cavity which has at least one partition for dividing the base of the mold cavity. As a result, one or more, preferably two, three, four, five, or six, bulges or pockets form in the molded chamber, which visually create a positive appearance. In particular, if only the regions of these bulges are completely or partially, preferably almost completely, filled with the gel phase(s), this region is again clearly separated from the granular mixture, in particular the particulate phase, and produces a visually very good appearance.

The water-soluble film can be fed from a roll and guided onto the mold cavity. The film is positioned and held in place on the mold. The film can be held in place by means of suction holes on the mold surface, which is not part of the mold cavity. However, the film can also be held on the mold by mechanical means, for example clips. For example, the film may be held in place by a stamp which presses on the seal region. In continuous preparation methods, e.g. drum methods and conveyor belt methods, it is preferable for the speed of the film to be matched to the speed of the conveyor belt formed from the molds, such that the film is not unnecessarily pulled thinner on account of being held in place on a running mold.

After the film is held in place relative to the mold cavity, a chamber is formed in the mold cavity region by adapting the film at least in part to the mold cavity. The film is adapted by means of elastic and/or plastic deformation. Preferably, the film deformation has a greater plastic than elastic proportion. The deformation of the water-soluble film is produced for example by deep-drawing or by means of a suitable stamp. A preferred variant is deep-drawing, by applying negative pressure (forming pressure) in the mold cavity; for this purpose, the mold cavity preferably comprises small openings, preferably in the bottom region, which are connected in terms of air pressure to a vacuum pump by means of corresponding lines.

In subsequent steps, the open chamber is then filled. Filled in this context means the open chamber being filled with quantities of the respective particulate or gel phases or of the liquid compositions. It is understood that the open chamber is only partially filled by being filled with one of the compositions/phases. Thus, there is still space in the open chamber for the introduction of additional phases or compositions.

After forming the open chamber, in step d), optionally, but preferably, said chamber or parts thereof are filled with the at least one gel phase of the product. As soon as the at least one gel phase has set, if necessary after an additional period of time required for setting, further product constituents can then be introduced into the chamber. In this case, one or more additional gel phases can be introduced after a first gel phase in step d).

Subsequently, in step e) at least one particulate phase can be introduced, the specifications and compositions of which have already been described in detail above. In this case, the at least one particulate phase according to step e) is preferably a solid comprising a granular mixture, and it is in particular particulate, in particular particulate and free-flowing.

It is preferable in the above-mentioned preparation method for the open chamber containing at least one gel phase and at least one particulate phase to not be completely filled with the gel phase(s). In this case, the chamber may preferably be filled with the gel phase(s) only in part, preferably only in the lower region or only in the region or just above the region of the bulges or pockets of the chamber formed by the optional partition according to a).

When filling with product, the deformed film is preferably still held in the cavity during filling. For example, when negative pressure is applied, the negative pressure is broken only after sealing. In this case, the negative pressure after forming the chamber, in relation to the forming pressure, may have a lower strength (higher pressure), which fulfils only the holding function.

It is important for the seal region to remain free of product. For example, if the chamber is at least partly elastically deformed, this elastic deformation, after filling and prior to sealing, should not be such that the product flows over and out of the open chamber and thus contaminates the seal region.

According to a particular embodiment, the cover is positioned on the open chamber such that in the next step the cover can be placed on the sealing region. The position of the cover is generally determined relative to the position of the chamber. If the chamber moves together with a movable mold on a conveyor belt, the cover has to move in the same way so that the position relative to the chamber remains the same.

The cover is then placed onto the open chamber, which is closed in this way. The contact between the cover and the film in the sealing region thus closes the chamber.

A preferred embodiment of the seal is a material fusion between the film and the cover, for example by solvating the film before applying the cover, or by melting the film and/or cover in the sealing region. Alternatively, the sealing is carried out by gluing or welding.

The positioning, applying, and sealing can take place either in separate steps or simultaneously.

The mold can also comprise at least one second mold cavity such that at least two open chambers are produced by method steps a) to d). The at least two chambers are formed in the same plane. It is preferable, in method step h), for the cover to be positioned over the at least two open chambers and, in method step i), for the cover to be placed on at least the two chambers in order to seal the portion pack at a sealing region. Since the at least two chambers are connected to the same cover, the chambers remain in a particular position relative to one another, in contrast with the prior art, in which adjacent chambers are connected by means of the partition that is formed by the thin films of the packages. It is easily possible to arrange three, four, five or more chambers side by side, which are filled with a corresponding number of gel phases (of the same or different composition).

It is particularly preferable for the cover to be provided as part of a strip, by feeding/transferring a strip that comprises at least one cover. Separating the cover may take place prior to positioning, after positioning but before being placed on, while being placed on, or after being placed onto the chamber.

When separated before positioning, the cover is preferably punched out. The cover and the film may also be separated at the same time as the sealing. The device which produces the seal by melting consists of at least two parts: one is the mold itself and the other is a counter-stamp which presses on the mold from the cover side. It is preferred that, in the sealing step, the pressure exerted during sealing at the sealing region by the mold and a further part must be lower than the pressure exerted in the separation region. The separation region surrounds the sealing region.

In the case of separation after sealing, the cover and film are alternatively preferably separated from the strip in the same step, and thus the portion packs are separated.

According to a preferred embodiment, two, three, four, five or six or more cavities that are separated from one another are present which are accordingly filled with one or more of the gel phases. Preferably, those washing or cleaning agents comprise three, four, five or six or more gel phases, it being possible for said gel phases to have the same or different compositions.

According to a particularly preferred embodiment of the method according to the invention for preparing washing and/or cleaning agent portions, before or after step e), the chamber is filled with at least one liquid composition, preferably containing perfume preparations and/or surfactants, in particular non-ionic surfactants.

This is advantageous in terms of more compact and simpler preparation of the particulate phases that are brought into contact with the liquid composition. In this case, the at least one liquid composition can be introduced into the open chamber, which optionally contains the at least one gel phase, which is already solidified, before the particulate phase is introduced.

Preferred methods involve, in step d), after filling the open chamber with the at least one gel phase, the gel phase solidifying or hardening.

Preferably, the liquid composition is applied to the already solidified gel phase introduced according to step c), such that the composition does not mix with the gel phase which has not yet solidified. Therefore, the at least one liquid composition, in particular comprising a perfume preparation and/or at least one surfactant, in particular non-ionic surfactant, is brought into direct contact with the at least one particulate phase by the subsequent introduction thereof. The composition may then impregnate or infiltrate the particulate phase.

It is likewise preferred for the at least one particulate phase to be applied before the liquid composition (preferably to the already solidified gel phase introduced according to step c)). Subsequently, the at least one liquid phase is then applied at least in part to the surface of the particulate phase and thus is in direct contact therewith. The liquid composition can thus impregnate or infiltrate the particulate composition. This results in an open chamber containing more compact washing or cleaning agents.

In both cases, the particulate phase in the open chamber can also be compacted by the application of pressure.

According to another preferred embodiment of the invention, the open chamber in step f) can be filled with at least one additional composition.

The additional composition according to step f) can be at least one additional liquid composition for further impregnation, as well as at least one additional particulate phase and/or at least one additional gel phase, as already described above. Preferably, a solidifying composition can also be introduced according to step f) (alternatively or additionally, such a solidifying composition can also be introduced after step c)). Suitable solidifying compositions (in addition to the gel phases that have already been mentioned) are, for example, those compositions as disclosed in DE102015213938 A1 or DE102015213939 A1. The disclosure contained herein is hereby completely incorporated by reference.

According to the above-mentioned preparation methods, it is also possible to produce multi-chamber pouches which contain at least one chamber which comprises at least one particulate phase according to the invention and at least one liquid composition, in particular additionally at least one gel phase according to the invention, in direct contact with one another, and also at least one additional, for example two, three or more additional separate chambers.

For the at least one particulate phase comprising granular mixtures of a solid composition, in particular the at least one particulate phase, that which has been described above applies to the cleaning agents according to the invention. It is preferable in this case for the at least one particulate phase to be particulate and free-flowing, preferably as described above.

For the liquid compositions, gel phases and particulate phases to be used in the methods according to the invention, the same applies as that which has been stated above in relation to the washing or cleaning agent portion, to which reference is hereby explicitly made. A particular suitability of the gel phases described above for said method lies in the fact that the rapid setting times of the gel phases, in particular the phases having PVOH, at least one polyhydric alcohol and polyethylene glycol having an average molar mass of from 200 to 600 g/mol, allows the step of leaving the gel phase(s) to set to be shortened or even renders said step unnecessary since such phases cool and set particularly quickly, without additional cooling, long production lines or longer standstill or waiting times being necessary.

In this connection, very particularly preferred embodiments of the present invention comprise, as at least one gel phase, 8 to 22 wt. % PVOH, 15 to 30 wt. % 1,3-propanediol, 30 to 40 wt. % glycerol, 5 to 15 wt. % sulfonic acid group-containing polyacrylate copolymer, 10-22 wt. % polyethylene glycol(s) having an average molar mass of from 200-600 g/mol, and optionally zinc salts, stated in wt. %, in each case based on the total weight of gel phase.

Depending on the preparation method, the gel phase(s) may be significantly above or below the sealing seam plane (first-mentioned method) or approximately at the level of the sealing seam plane (last-mentioned method).

The present invention also relates to washing or cleaning agent portions, as can be obtained using one of the methods described above.

The present application also relates to a method for cleaning hard surfaces, in particular dishes, in which the surface is worked in an inherently known manner using a cleaning agent according to the invention. In particular, the surface is brought into contact with the washing or cleaning agent according to the invention. The cleaning is performed in particular using a cleaning machine, preferably a dishwasher.

The present invention also relates to the use of a cleaning agent for cleaning hard surfaces, in particular dishes, in particular in automatic dishwashers. The invention also relates to the use of a washing agent portion for the machine cleaning of laundry or textiles.

In a preferred embodiment, the present application relates to automatic dishwashing detergent. In terms of the present application, automatic dishwashing detergents are compositions that can be used to clean soiled dishes in an automatic dishwashing process. The automatic dishwashing detergents according to the invention thus differ from automatic rinse aids, which are always used in combination with automatic dishwashing detergents and do not have any cleaning effect of their own.

Insofar as it is stated in the present application that the washing or cleaning agent according to the invention comprises something completely or in the at least one particulate phase or in the at least one gel phase or in the at least one liquid composition, this shall also be regarded such that the washing or cleaning agents, or the relevant phase, can consist thereof. In the following practical example, the washing or cleaning agent according to the invention is described in a non-limiting manner.

EMBODIMENTS

Cleaning agents according to the invention were prepared that comprise a solid phase and a gel phase. Different geometries were produced in the process. In addition, cleaning agents were prepared that comprise two solid phases and a gel phase. Cleaning agents were also prepared that comprise a solid phase and three, four and five gel phases (having the same or different composition). The following quantities refer to wt. % of active substance based on the total weight of the relevant phase (unless indicated otherwise).

TABLE 1

The solid granular mixtures of a solid composition, in particular powdered and free-flowing phases, had the following preferred composition:

| | wt. % |
|---|---|
| Citrate, Na salt | 15-20 |
| Phosphonate (e.g. HEDP) | 2.5-7.5 |
| MGDA, Na salt | 0-25 |
| Disilicate, Na salt | 5-35 |
| Soda | 10-25 |
| Silver protection (e.g. cysteine) | 0.0-1.0 |
| Percarbonate, Na salt | 10-15 |
| Bleach catalyst (preferably Mn-based) | 0.02-0.5 |
| Bleach activator (e.g. TAED) | 1-3 |
| Non-ionic surfactant(s), e.g., fatty alcohol alkoxylate, preferably 20-40 EO, optionally end-capped | 2.5-10 |
| Polycarboxylate | 4-10 |
| Cationic copolymer | 0-0.75 |
| Disintegrant - (e.g. crosslinked PVP) | 0-1.5 |
| Protease preparation (tq) | 1.5-5 |
| Amylase preparation (tq) | 0.5-3 |
| Perfume | 0.05-0.25 |
| Dye solution | 0.0-1 |
| Zn salt (e.g. acetate) | 0.1-0.3 |
| Sodium sulfate | 0.0-10 |
| Water | 0.0-1.5 |
| pH adjuster (e.g. citric acid) | 0-1.5 |
| Processing auxiliaries | 0-5 |

TABLE 2

The gel phases used had the following compositions (quantities in each case based on the total quantity of the gel phase):

| | wt. % |
|---|---|
| Water-soluble zinc salt (preferably zinc acetate anhydrate) | 0.1-2.4 |
| Glycerol | 10-50 |
| Propanediol (preferably 1,3-propanediol) | 10-50 |
| Polycarboxylate; Copolymer with sulfonic-acid containing | 0-30 |
| Nonionic surfactant(s), e.g., fatty alcohol alkoxylate, preferably 20-40 EO, optionally end-capped | 0-40 |
| Polyethylene glycol avg. molar mass 200-600 (for example PEG 400 (INCI)) | 8-26 |
| PVOH | 8-22 |
| Processing auxiliaries | 0-10 |
| Dye solution | 0.0-1.5 |
| Misc., other active substances, organic solvents, perfume, | To make up to 100 |

The solid and gel phases could be combined as desired. The spatial configuration of the gel phase, which was liquid after mixing of the ingredients and dimensionally stable within a setting time of a maximum of 10 minutes, was predetermined by the spatial configuration of the solid phase and by molds that are commercially available or self-designed. A water-soluble wrapping in the form of an open pouch was produced by deep-drawing a PVOH-containing film. A liquid composition was poured into said open cavity and resulted in the gel phase after curing, then solid phases in the form of a free-flowing solid were poured into a pouch comprising polyvinyl alcohol. 1.0 g of the liquid non-ionic surfactant Genapol EC 50 was metered onto the resulting particulate surface. The proportion of non-ionic surfactants could thus be increased significantly without changing other phases. The open pouch was then sealed by applying a second film and sealing by heat sealing. The cleaning agent portions thus prepared were characterized by appealing esthetics.

What is claimed is:

1. A washing and/or cleaning agent portion which comprises at least one chamber and a water-soluble wrapping, characterized in that the washing and/or cleaning agent portion comprises at least one particulate phase, at least one solid gel phase directly adjacent to the at least one particulate phase, the gel phase comprising as % wt of the gel phase: 8-26 wt. % polyethylene glycol having an average molecular weight of from 200-600 g/mol, 10-50 wt. % glycerol, 8-22 wt. % polyvinyl alcohol, and 10-50 wt. % $C_3$-$C_5$ alkanediol;

wherein the at least one solid gel phase penetrates a maximum of 1 mm into interstices of the at least one particulate phase during a storage period of 4 weeks at 25° C.; and wherein at least one particulate phase is completely impregnated with at least one liquid composition.

2. The washing and/or cleaning agent portion according to claim 1, characterized in that the at least one particulate phase is free-flowing.

3. The washing and/or cleaning agent portion according to claim 2, characterized in that the at least one particulate phase is free-flowing at the time of addition.

4. The washing and/or cleaning agent portion according to claim 1, characterized in that the at least one liquid composition comprises surfactants, and/or perfume preparations.

5. The washing and/or cleaning agent portion according to claim 4, characterized in that the at least one liquid composition comprises non-ionic surfactants and/or perfume preparations.

6. The washing and/or cleaning agent portion according to claim 4, characterized in that the at least one liquid composition is low in water.

7. The washing and/or cleaning agent portion according to claim 4, characterized in that the at least one liquid composition is substantially water-free.

8. The washing and/or cleaning agent portion according to claim 4, characterized in that the weight ratio of the total quantity of the at least one liquid composition to the total quantity of the at least one particulate phase is from 1:800 to 5:1 and/or the weight proportion of the at least one liquid composition to the total weight of the composition formed from the at least one liquid composition and the at least one particulate composition is from 0.0001 to 25 wt. %.

9. The washing and/or cleaning agent portion according to claim 8, characterized in that the weight ratio of the total quantity of the at least one liquid composition to the total quantity of the at least one particulate phase is from 1:600 to 2:1, and/or the weight proportion of the at least one liquid composition to the total weight of the composition formed from the at least one liquid composition and the at least one particulate composition is from 0.005 to 20 wt. %.

10. The washing and/or cleaning agent portion according to claim 4, characterized in that the surfactant content of the at least one liquid composition is at least 50 wt. % based on the total weight of the liquid composition.

11. The washing and/or cleaning agent portion according to claim 10, characterized in that the surfactant content of the at least one liquid composition is at least 70 wt. % based on the total weight of the liquid composition.

12. The washing and/or cleaning agent portion of claim 1, wherein the at least one solid gel phase further comprises less than 1 wt. % anionic surfactant.

13. The washing and/or cleaning agent portion according to claim 1, characterized in that the particulate phase contains at least one additional ingredient selected from the group consisting of builders, polymers, bleaching agents, bleach activators, bleach catalysts, enzymes, sequestering agents, electrolytes, corrosion inhibitors, glass corrosion inhibitors, suds suppressors, dyes, additives for improving the flow and drying behavior, disintegration agents, preservatives, pH adjusters, fragrances, and perfume carriers.

14. A method for preparing washing and/or cleaning agent portions that contain a product comprising at least one particulate phase, comprising:

a) providing a mold having at least one mold cavity, optionally containing at least one partition for dividing the base of the mold cavity;

b) adding a water-soluble film to the mold cavity;

c) forming at least one open chamber in the mold cavity by deforming the water-soluble film;

d) adding to the open chamber at least one solid gel phase comprising as % wt of the gel phase: 8-26 wt. % polyethylene glycol having an average molecular weight of from 200-600 g/mol, 10-50 wt. % glycerol, 8-22 wt. % polyvinyl alcohol, and 10-50 wt. % $C_3$-$C_5$ alkanediol;

e) adding to the open chamber at least one particulate phase so that the at least one particulate phase is directly adjacent to the at least one solid gel phase, wherein the at least one solid gel phase penetrates a maximum of 1 mm into the interstices of the directly adjacent particulate phase during a storage period of 4 weeks at 25° C.;

f) adding to the open chamber at least one liquid composition, wherein the at least one particulate phase is completely impregnated with the at least one liquid composition;

g) providing a second water-soluble film as a cover;

h) superimposing the open chamber and the cover in order to seal the portion pack at a sealing region; and i) sealing the cover with the open chamber.

* * * * *